United States Patent
Asami et al.

(10) Patent No.: US 7,105,902 B2
(45) Date of Patent: Sep. 12, 2006

(54) OPTICAL DEVICE HAVING MOVABLE PORTION AND METHOD FOR MANUFACTURING THE SAME

(75) Inventors: Kazushi Asami, Okazaki (JP); Kazuhiko Kano, Toyoake (JP); Tetsuo Y Shioka, Okazaki (JP)

(73) Assignee: Denso Corporation, Kariya (JP)

( * ) Notice: Subject to any disclaimer, the term of this patent is extended or adjusted under 35 U.S.C. 154(b) by 87 days.

(21) Appl. No.: 10/752,588

(22) Filed: Jan. 8, 2004

(65) Prior Publication Data

US 2004/0155243 A1    Aug. 12, 2004

(30) Foreign Application Priority Data

Feb. 10, 2003   (JP)   ............................. 2003-032721

(51) Int. Cl.
*H01L 29/82*   (2006.01)
(52) U.S. Cl. ...................... 257/415; 257/108; 257/428
(58) Field of Classification Search .................... None
See application file for complete search history.

(56) References Cited

U.S. PATENT DOCUMENTS

| 5,959,760 | A |   | 9/1999 | Yamada et al. | |
|---|---|---|---|---|---|
| 6,026,617 | A | * | 2/2000 | Stark | ........................ 52/204.66 |
| 6,181,460 | B1 | * | 1/2001 | Tran et al. | ................... 359/291 |
| 6,690,850 | B1 | * | 2/2004 | Greywall | ..................... 385/18 |
| 2002/0114053 | A1 |   | 8/2002 | Yasuda et al. | |

FOREIGN PATENT DOCUMENTS

| JP | A-H10-270719 | 10/1998 |
|---|---|---|
| JP | 2002-341264 | 11/2002 |

* cited by examiner

*Primary Examiner*—Wai-Sing Louie
(74) *Attorney, Agent, or Firm*—Posz Law Group, PLC

(57) ABSTRACT

An optical device includes a semiconductor substrate having an opening, a support member disposed on the substrate, and a movable portion disposed on the opening of the substrate. The movable portion is supported by the support member so that the movable portion is movable. The device has a large scanning angle. Further, the device can scan widely at any frequency.

14 Claims, 22 Drawing Sheets

OPTICAL DEVICE HAVING MOVABLE PORTION AND METHOD FOR MANUFACTURING THE SAME

CROSS REFERENCE TO RELATED APPLICATION

This application is based on Japanese Patent Application No. 2003-32721 filed on Feb. 10, 2003, the disclosure of which is incorporated herein by reference.

FIELD OF THE INVENTION

The present invention relates to an optical device having a movable portion and a method for manufacturing the same.

BACKGROUND OF THE INVENTION

An optical device, i.e., an optical scanner according to a prior art is disclosed in Japanese Patent Application Publication No. H11-52278. The scanner 100 has a construction shown in FIGS. 37A and 37B. The scanner 100 includes a silicon substrate 110 having a concavity 101. A movable portion 103 is formed on an opening of the concavity 101. The movable portion 103 is supported by a pair of torsion bars (i.e., torsion beams) 102a, 102b. A mirror 104 is formed on the movable portion 103. A pair of fixed electrodes 106a, 106b is formed on the silicon substrate 110 through an insulation film 105.

Each fixed electrode 106a, 106b faces a movable electrode 107a, 107b of the movable portion 103, respectively. Electric voltage is applied alternately between the fixed electrode 106a, 106b and the movable electrode 107a, 107b, so that the movable portion 103 is oscillated with an electro-static force generated between the fixed electrode 106a, 106b and the movable electrode 107a, 107b. At this time, the movable electrode 107a, 107b does not interfere with the fixed electrode 106a, 106b, for example, the movable electrode 107a, 107b does not touch with fixed electrode 106a, 106b.

To broad a scanning angle of the scanner 100, it is required to enlarge the maximum oscillation angel of the movable portion 103. In view of this requirement, for example, the applied voltage between the fixed electrode 106a, 106b and the movable electrode 107a, 107b is increased, or a diameter of the torsion bar 102a, 102b is decreased so that a torsional rigidity of the torsion bar 102a, 102b is reduced. However, in case of increasing the applied voltage, a power supply for supplying the applied voltage is required to increase its voltage. Therefore, electric power consumption is increased. In case of decreasing the torsional rigidity, the torsion bar 102a, 102b may be broken with fatigue failure, so that durability of the torsion bar 102a, 102b is reduced (i.e., a fatigue strength of the torsion bar 102a, 102b is reduced).

SUMMARY OF THE INVENTION

In view of the above problem, it is an object of the present invention to provide an optical device having a movable portion. Specifically, the device has a large scanning angle.

It is another object of the present invention to provide a method for manufacturing an optical device having a movable portion.

An optical device includes a semiconductor substrate having an opening, a support member disposed on the substrate, and a movable portion disposed on the opening of the substrate. The movable portion is supported by the support member so that the movable portion is movable.

The above device has a large scanning angle.

Preferably, the substrate is a silicon-on-insulator substrate, which includes a first silicon layer, an embedded insulation film and a second silicon layer in this order, and the opening of the substrate provides a through hole, which is disposed in the substrate. More preferably, the movable portion is separated from the second silicon layer by a trench, and the trench connects to the through hole so that the movable portion is separated from the substrate by the trench and the through hole. Furthermore preferably, the support member is includes a pair of beams, and each beam is separated from the second silicon layer and the embedded insulation layer by the trench so that the beam is on the embedded insulation layer. Further preferably, each beam includes a lower portion having a wedge shape, which contacts the embedded insulation film so that the beam is movable. In the above cases, the device has a large scanning angle. Further, the device can scan widely at any frequency.

Preferably, the device further includes a conductive material disposed in the trench between the beam and the second silicon layer. Here, the conductive material has a Young's modulus, which is smaller than that of the beam, and the beams are electrically connected to the second silicon layer through the conductive material. In this case, the device has a large scanning angle. Further, the device can scan widely and have a stable oscillation at any frequency.

Further, a method for manufacturing the device according to claim 1 is provided. The method includes the steps of forming the opening in the semiconductor substrate, and forming the movable portion together with the support member so that the movable portion is movably supported by the support member. In this case, the device manufactured by this method has a large scanning angle. Further, the device can scan widely at any frequency.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
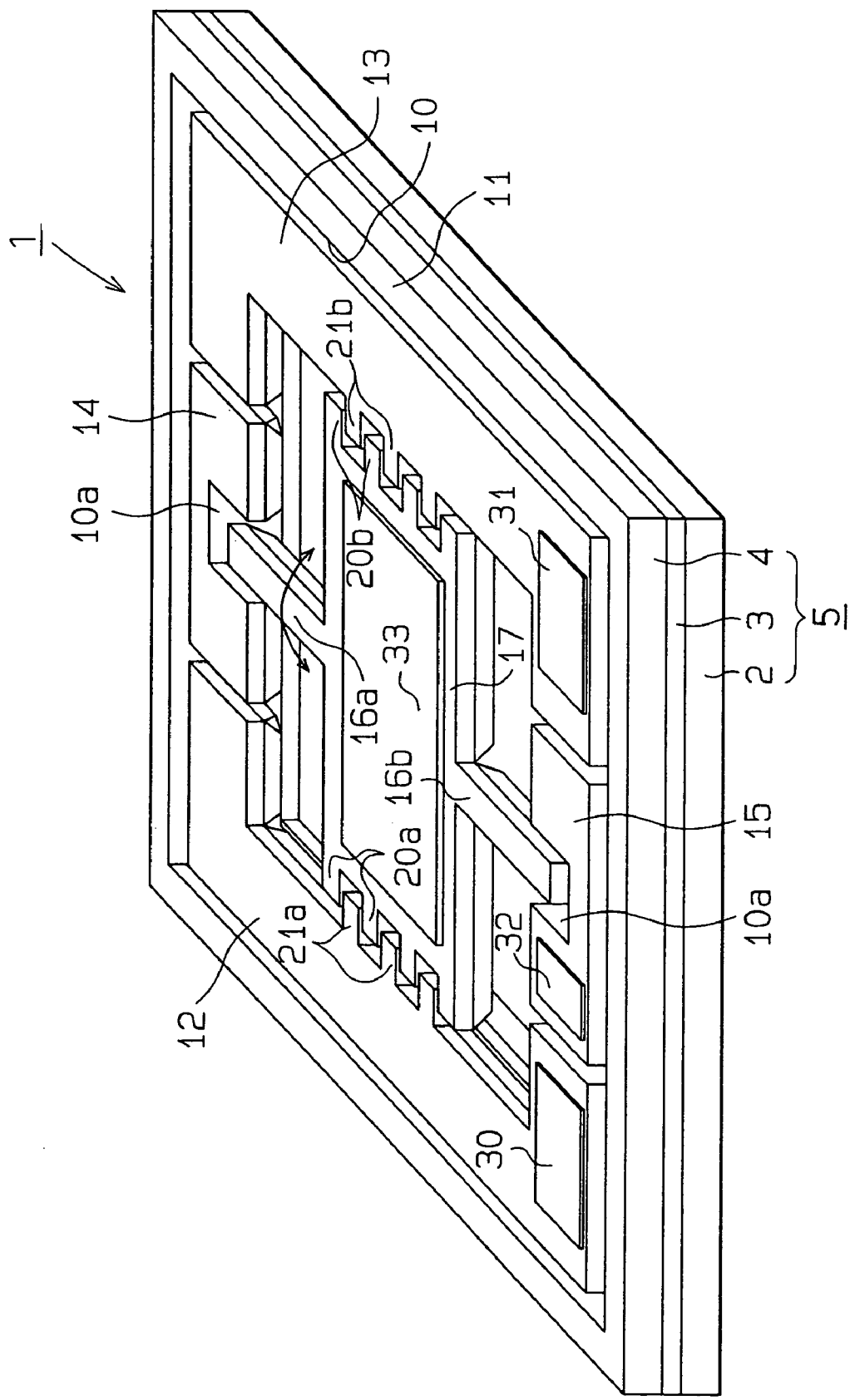
FIG. 1 is a perspective view showing an optical device according to a first embodiment of the present invention.

An optical device 1 according to a first embodiment of the present invention is shown in FIG. 1. The optical device 1 is suitably used for an optical scanner. The optical device 1 includes a substrate 5, which is a silicon-on-insulator substrate (i.e., a SOI substrate). The SOI substrate 5 has the first silicon layer 2, an embedded insulation film 3 (i.e., an embedded oxide film) and the second silicon layer 4. The second silicon layer 4 is formed on the first silicon layer 2 through the embedded oxide film 3.

As shown in FIGS. 2–5, a trench 10 is formed in the second silicon layer 4. The trench 10 reaches the embedded oxide film 3. The trench 10 separates the first fixed portion (i.e., a square frame) 11, the second fixed portion (i.e., the first fixed electrode) 12, the third fixed portion (i.e., the second fixed electrode) 13, the fourth fixed portion 14, the fifth fixed portion (i.e., an electric power supply portion) 15, and a movable portion 17. The movable portion 17 is supported by a pair of beams 16a, 16b so that the movable portion 17 with the beams is on the embedded oxide film 3. The movable portion 17 as a massive portion has a rectangular shape. Each beam 16a, 16b having a rod shape extends from a center of a wide side of a rectangle of the movable portion 17. A pair of comb-teeth movable electrodes 20a, 20b is formed on a narrow side of the rectangle of the movable portion 17.

A pair of comb-teeth fixed electrodes 21a, 21b is formed on the second fixed portion 12 or the third fixed portion 13 in such a manner that each comb-teeth fixed electrode 21a, 21b faces the comb-teeth movable electrode 20a, 20b of the movable portion 17. An electric potential, i.e., an electric voltage is applied between the comb-teeth fixed and movable electrodes 20a, 20b, 21a, 21b so that an electro-static force is generated between the comb-teeth fixed and movable electrodes 20a, 20b, 21a, 21b.

An aluminum pad 30 is formed on the foreside surface of the second fixed portion 12. The electric voltage is applied to the comb-teeth fixed electrode 21a through the aluminum pad 30. Another aluminum pad 31 is formed on the foreside surface of the third fixed portion 13. The electric voltage is also applied to the comb-teeth fixed electrode 21b through the aluminum pad 31.

Figure 4:
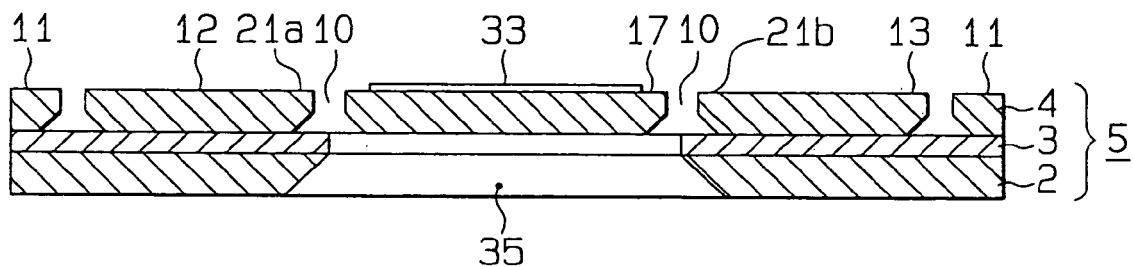
FIG. 4 is a cross-sectional view showing the device taken along line IV—IV in FIG. 2.
Figure 5:
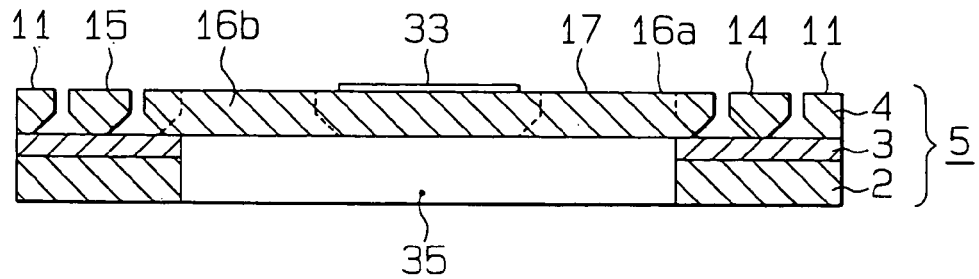
FIG. 5 is a cross-sectional view showing the device taken along line V—V in FIG. 2.

As shown in FIGS. 4 and 5, a through hole 35 is formed in a center of the SOI substrate 5 in such a manner that part of the first silicon layer 2 and part of the embedded oxide film 3 are eliminated so as to form the through hole 35. The through hole 35 has an opening disposed on a periphery of the movable portion 17 having the rectangular shape. In the opening of the through hole 35, the movable portion 17 with the comb-teeth movable electrodes 16a, 16b is oscillated. In this case, the rod-shaped beams 16a, 16b support the movable portion 17 so that the beams 16a, 16b work as a supporting point. Specifically, the movable portion 17 is oscillated at around a line formed between two beams 16a, 16b.

Thus, the through hole 35 connecting to the trench 10 is formed in the first silicon layer 2 and the embedded oxide film 3. Here, the trench 10 separates the movable portion 17 from the other part. The movable portion 17 is oscillated in the through hole 35 since the movable portion 17 is supported by the beams 16a, 16b. The movable portion 17 works as a light-reflecting portion.

A reflection mirror 33 is formed on the foreside surface of the movable portion 17 having the rectangular shape. The mirror 33 is made of metal film such as an aluminum thin film. The mirror 33 is also oscillated together with the movable portion 17. Specifically, the mirror 33 changes its direction together with an oscillation of the movable portion 17. Thus, a light such as a laser beam is reflected on the mirror 33, while the mirror 33 is oscillated so that the light changes its direction (i.e., light path). Accordingly, the light changes its light path periodically when the movable portion 17, i.e., the mirror 33 is oscillated, so that the light scans an object (not shown).

Figure 2:
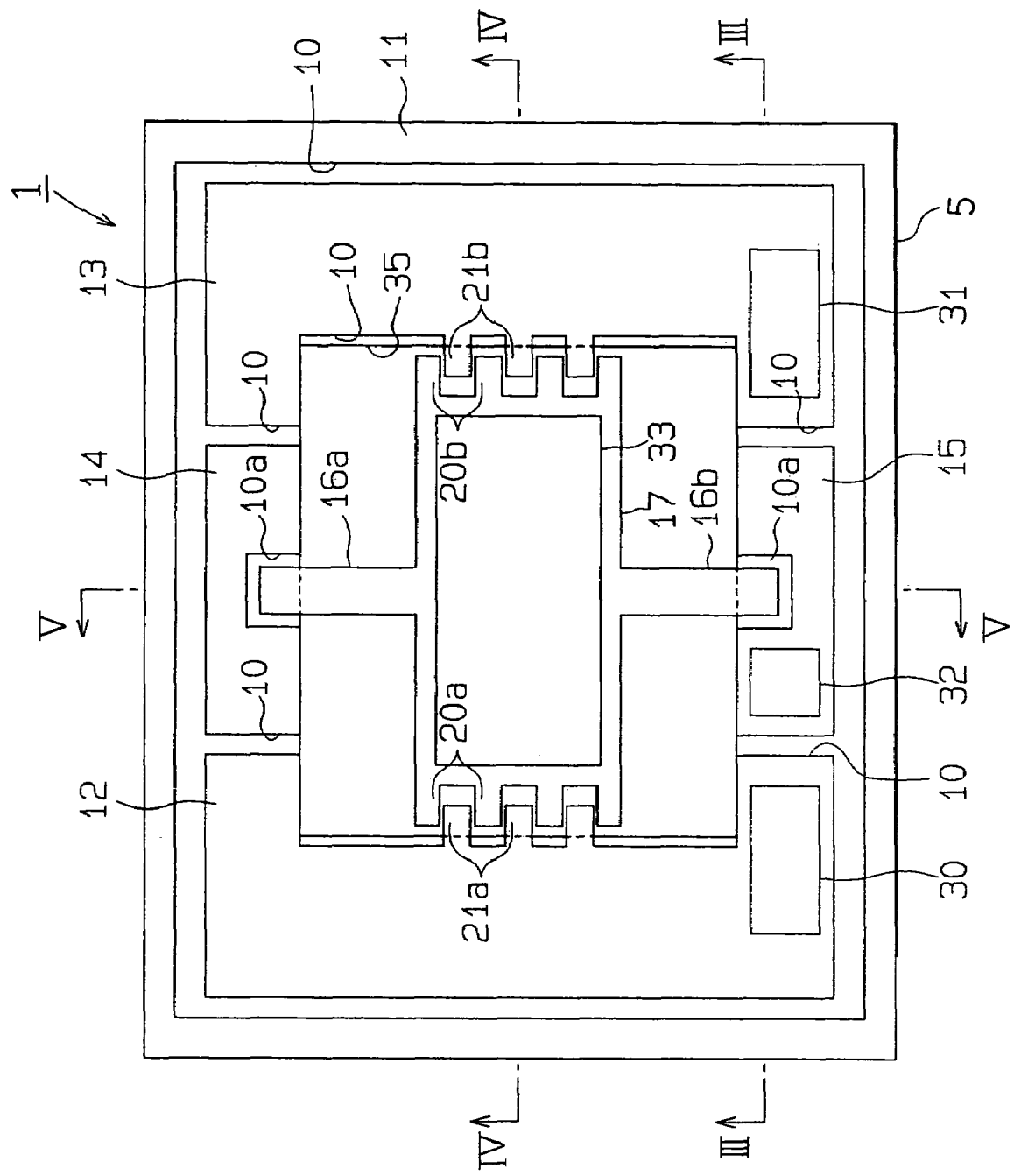
FIG. 2 is a plan view showing the device according to the first embodiment.
Figure 3:
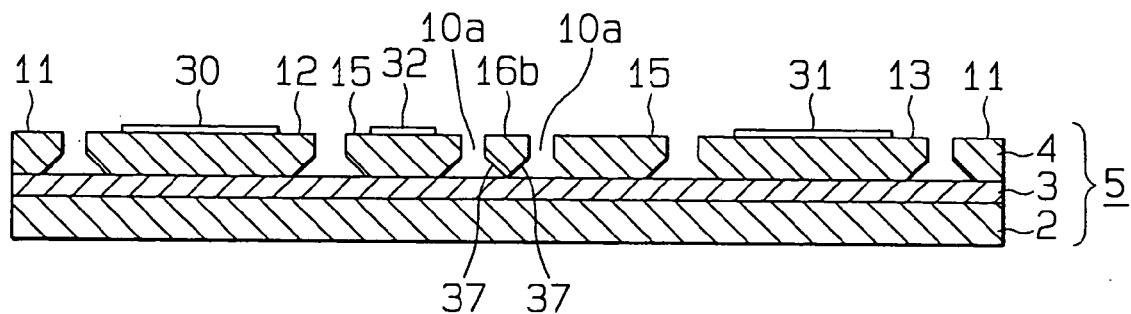
FIG. 3 is a cross-sectional view showing the device taken along line III—III in FIG. 2.

As shown in FIGS. 1 and 2, the trench 10a is formed in the second silicon layer 4, and the trench 10 reaches the embedded oxide film 3. The trench 10 separates the beams 16a, 16b formed in the second silicon layer 4 from the other part disposed around the beams 16a, 16b. Here, the other part is fixed on the first silicon layer 2. As shown in FIG. 3, the lower part of the beam 16a, 16b has a slant surface 37. Therefore, the lower part of the beam 16a, 16b has a wedge shape, i.e., the wedge-shaped beam 16a, 16b contacts the embedded oxide film 3. Here, the beam 16a, 16b is formed of the second silicon layer 4. Accordingly, the beam 16a, 16b is separated from the embedded oxide film 3.

An aluminum pad 32 is formed on the foreside surface of the fifth fixed portion 15. The comb-teeth movable electrode 20a, 20b is energized through the aluminum pad 32. Specifically, when the electric voltage is applied to the aluminum pad 32, the electro-static force is generated. Accordingly, the beam 16b is attracted to the fifth fixed portion 15, so that the beam 16b contacts the fifth fixed portion 15. As a result, the electric voltage is applied to the comb-teeth movable electrode 20a, 20b through the beam 16b.

Figure 6A:
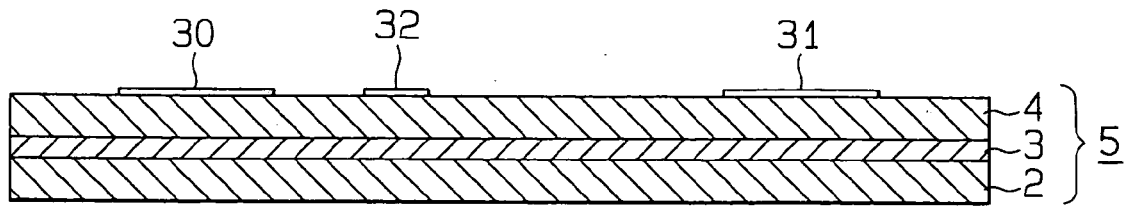
FIGS. 6A–6C are cross-sectional views explaining a method for manufacturing the device according to the first embodiment.

Next, the optical device 1 is manufactured as follows. As shown in FIG. 6A, the SOI substrate 5 is prepared. The aluminum pads 30–32 are formed on the second silicon layer 4 at a predetermined position. Also, the mirror 33 is formed on the second silicon layer 4.

Figure 6B:
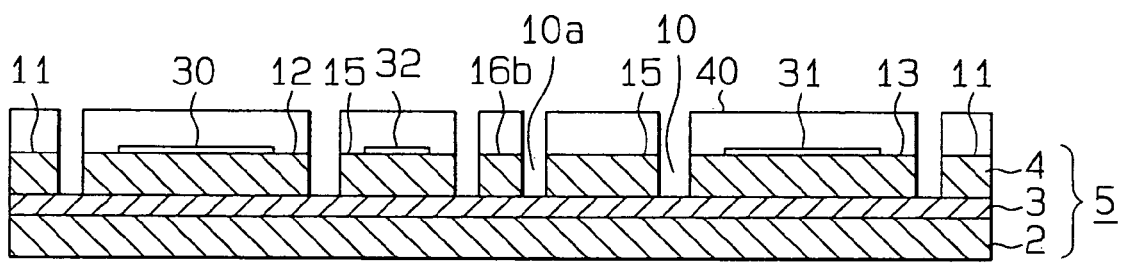
Figure 6C:
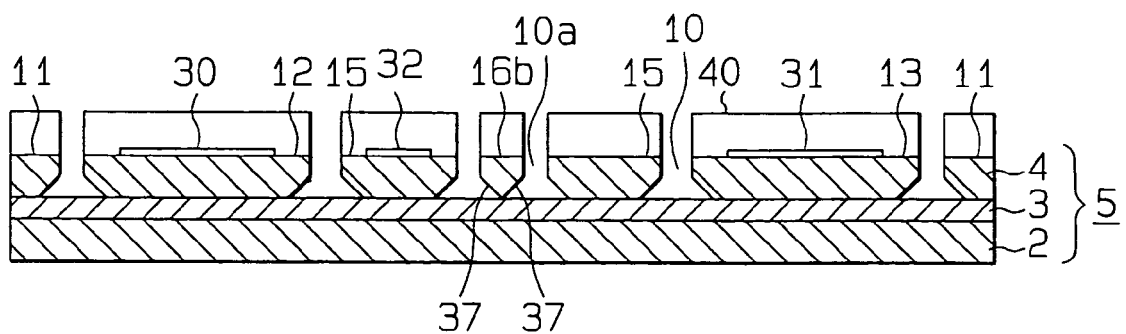

As shown in FIG. 6B, a mask 40 is formed on the second silicon layer 4. Then, the second silicon layer 4 is etched with using the mask 40, so that the trench 10 is formed so as to reach the embedded oxide film 3. This etching is performed with dry-etching method. At that time, another trench 10a is also formed. Further, the second silicon layer 4 is over-etched so that the slant surface 37 of the lower part of the beam 16a, 16b is formed. The slant surface 37 is disposed near a contact portion between the second silicon layer and the embedded oxide film 3.

Figure 7A:
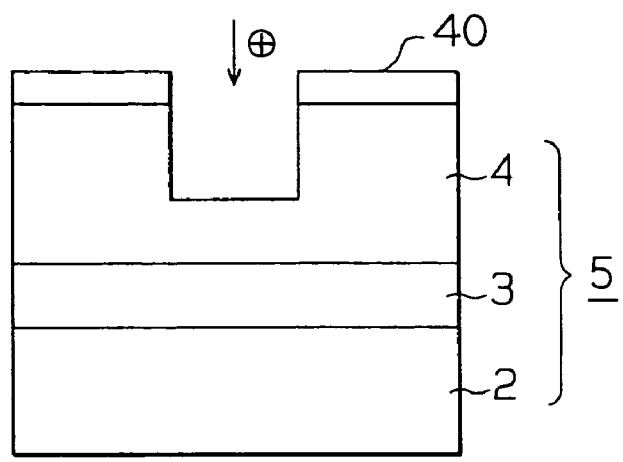
FIGS. 7A–7C are cross-sectional views explaining the method for manufacturing the device according to the first embodiment.
Figure 7B:
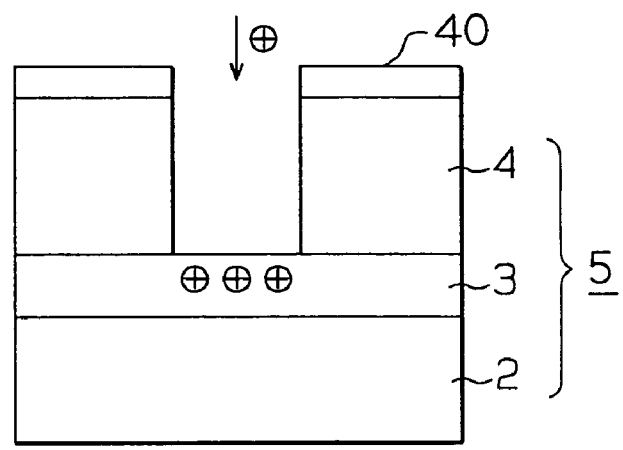
Figure 7C:
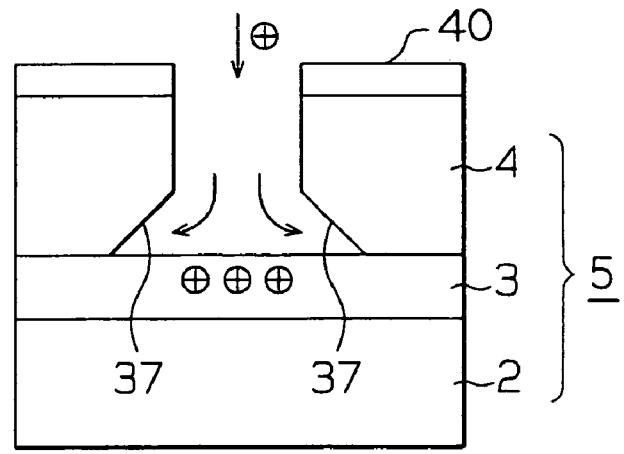

This over-etching is described as follows. As shown in FIG. 7A, the second silicon layer 4 is etched from the surface of the second silicon layer 4 at first in the dry-etching process. Specifically, ions irradiate on the second silicon layer 4 through an opening of the mask 40. Then, the trench 10 reaches the embedded oxide film 3. In this case, the surface of the embedded oxide film 3 charges positively, as shown in FIG. 7B. Further, the dry-etching is continued, i.e., the over-etching is performed, so that the ions are bent by the positive charge disposed on the surface of the embedded oxide film 3. Thus, the lower part of the second silicon layer 4 is etched with the ions, so that the slant surface 37 of the beam 16a, 16b is formed. This over-etching is called as a notching effect.

Accordingly, the beam 16a, 16b is separated from the other part of the second silicon layer 4 and the embedded oxide film 3 in such a manner that the trench 10a is over-etched. Specifically, the trench 10a is formed with using the dry-etching method. Even when the trench 10a reaches the embedded oxide film 3, the dry-etching is continued, so that the slant surface 37 of the beam 16a, 16b is formed. The ions are bent by the positive charge disposed on the surface of the embedded oxide film 3, so that the slant surface 37 (i.e., a notch) is formed between the embedded silicon film 3 and the second silicon layer 4. Further, the dry-etching is continued so that the beam 16a, 16b is separated. Thus, the beam 16a, 16b is formed to have the wedge shape with using the notching effect when the trench 10a is formed.

Figure 8A:
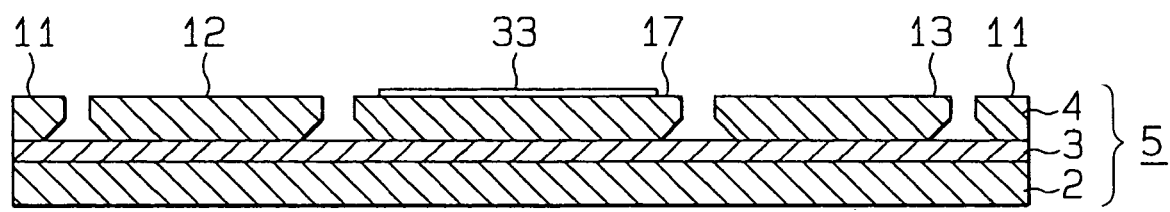
FIGS. 8A and 8B are cross-sectional views explaining a notching effect, according to the first embodiment.
Figure 8B:
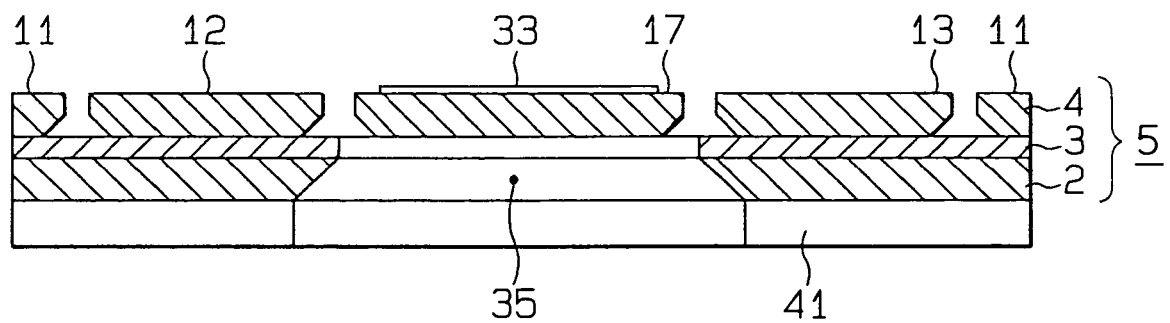

After the dry-etching, a mask 41 is formed on the backside surface of the SOI substrate, i.e., the surface of the first silicon layer 2, as shown in FIGS. 8A and 8B. With using the mask 41, part of the first silicon layer 2 and part of the embedded oxide film 3 is dry-etched so that the through hole 35 is formed.

Figure 9:
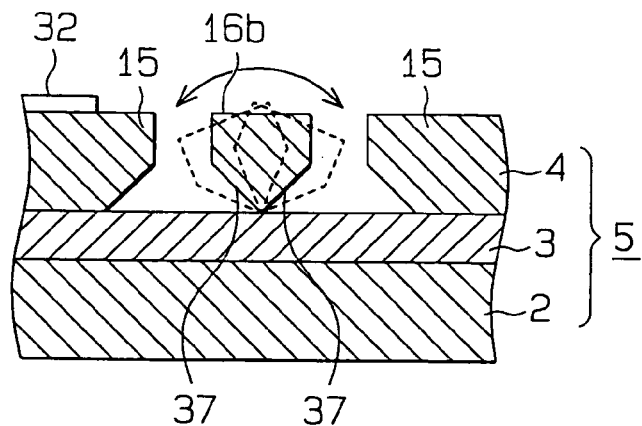
FIG. 9 is a cross-sectional view explaining an operation of the device according to the first embodiment.
Figure 37A:
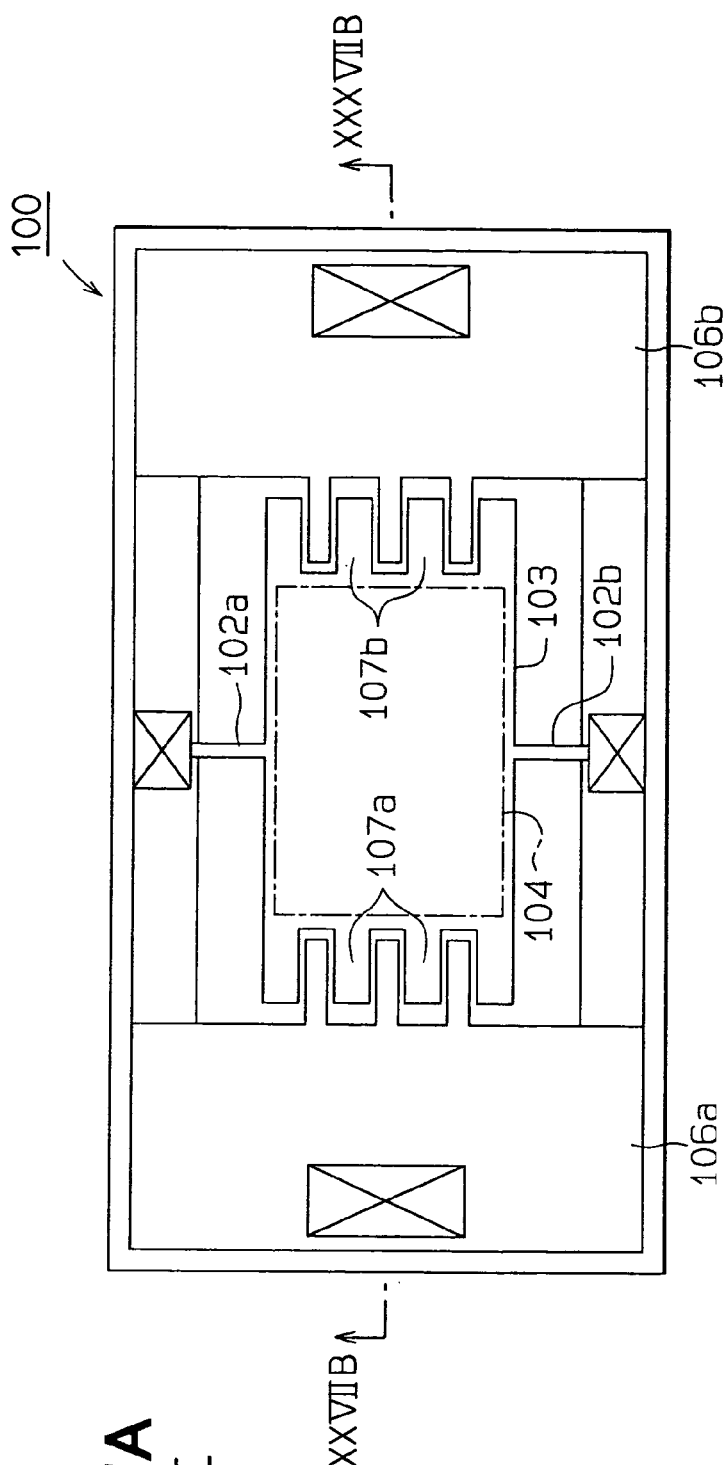
FIG. 37A is a plan view showing an optical device according to a prior art.
Figure 37B:
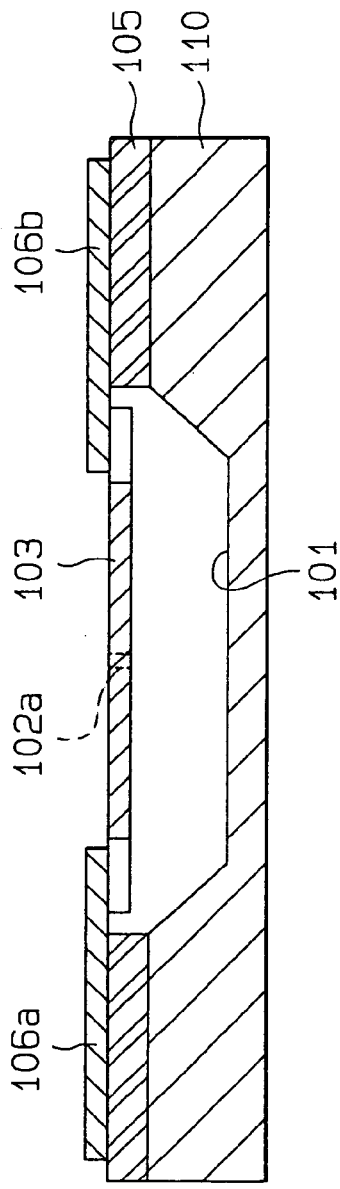
FIG. 37B is a cross-sectional view showing the device taken along line XXXVIIB—XXXVIIB in FIG. 37A.

Thus, the device 1 has a predetermined construction described as follows. The trench 10a disposed in the second silicon layer 4 reaches the embedded oxide film 3 so that the beam 16a, 16b is separated from the other part of the second silicon layer 4. Further, the beam 16a, 16b is separated from the embedded oxide film 3. Therefore, the beam 16a, 16b can be moved freely. Thus, as shown in FIG. 9, the beam 16a, 16b can be rotated with a small electro-static force, so that the movable portion 17 is oscillated easily and widely. Further, the amplitude of the movable portion 17 becomes larger, even when the movable portion 17 is oscillated at a certain frequency, which is not the resonant frequency of the movable portion 17. That is because the beam 16a, 16b works as a torsion bar having a small restoring force, so that the amplitude of the movable portion 17 becomes larger than that of the optical scanner 100 shown in FIG. 37. Here, the optical scanner 100 has the torsion bar 102a 102b having a comparatively large restoring force in relation to a small electro-static force. Therefore, the amplitude of the movable portion 103 in the scanner 100 is large only when the movable portion 103 is oscillated at around the resonant frequency.

Specifically, the movable portion 103, i.e., the mirror 104 rotates until the rotation force according to the electro-static force is balanced with an elastic force, i.e., the restoring force of the torsion bar 102a, 102b. When the electric voltage applied between the fixed electrode 106a, 106b and the movable electrode 107a, 107b becomes zero, the torsion bar 102a, 102b returns to an equilibrium position. Therefore, the electric voltage is alternately applied to the fixed electrode 106a, 106b and the movable electrode 107a, 107b, so that the movable portion 103 is oscillated repeatedly. However, the electro-static force between the fixed electrode 106a, 106b and the movable electrode 107a, 107b is comparatively small, so that the amplitude of the movable portion 103 is small unless the movable portion 103 is oscillated at around the resonant frequency. Here, when the movable portion 103 is oscillated at the resonant frequency, the movable portion 103 is synchronized with a reciprocation of the movable portion 103 so that the amplitude of the movable portion becomes larger. Thus, the scanner 100 according to the prior art cannot scan widely at any frequency except for the resonant frequency.

However, the optical device 1 according to the first embodiment of the present invention can scan widely at any frequency. Specifically, even when the movable portion 17 is oscillated at a certain frequency, which is not the resonant frequency of the movable portion 17, the amplitude of the movable portion 17 is large, i.e., the scanning angle of the movable portion 17 is large. Thus, the movable portion 17 scans widely.

Thus, the device 1 has a large scanning angle without increasing the applied voltage between the comb-teeth fixed electrode 21a, 21b and the comb-teeth movable electrode 21a, 21b or without decreasing dimensions of the beam 16a, 16b. Here, the dimensions of the beam 16a, 16b is defined as a diameter or one side length of a cross-section of the beam 16a, 16b.

Second Embodiment

Figure 10:
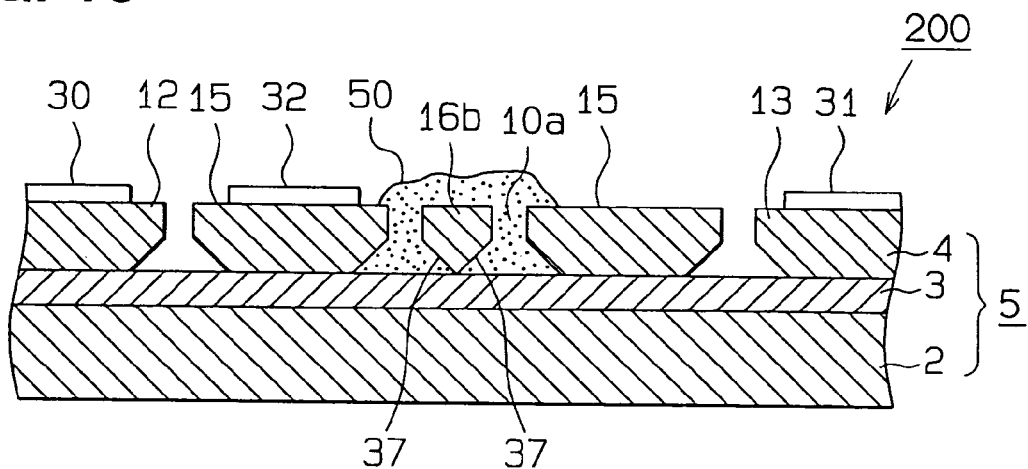
FIG. 10 is a cross-sectional view showing an optical device according to a second embodiment of the present invention.

An optical device 200 according to a second embodiment of the present invention is shown in FIG. 10. The device 200 includes a conductive material 50. The beam 16a, 16b is separated from the other part of the second silicon layer 4 and the embedded oxide film 3. Here, the trench 10a separates the beam 16a, 16b from the other part. The conductive material 50 is disposed in the trench 10a. The conductive material 50 has a small Young's modulus, which is smaller than that of the beam 16a, 16b (i.e., Young's modulus of the second silicon layer 4). The conductive material 50 is formed of, for example, conductive resin. Therefore, the beam 16a, 16b connects to the other part of the second silicon layer 4 electrically.

Accordingly, the electric potential of the movable portion 17, i.e., the comb-teeth movable electrode 20a, 20b sets to be equal to that of the fifth fixed portion 15. Therefore, the electric potential of the movable portion 17 is stabilized so that the movable portion 17 is oscillated surely. Further, the movable portion 17 does not prevent from being oscillated substantially since the Young's modulus of the conductive material 50 is smaller than that of the beam 16a, 16b. Furthermore, the movable portion 17 is supported by the conductive material 50 so that the movable portion 17 is oscillated precisely. It is preferred that the conductive material 50 includes a material having a small restoring force, which is smaller than that of the beam 16a, 16b.

Thus, the device 200 has a large scanning angle. Further, the device 200 can scan widely and have a stable oscillation at any frequency.

Third Embodiment

Figure 11:
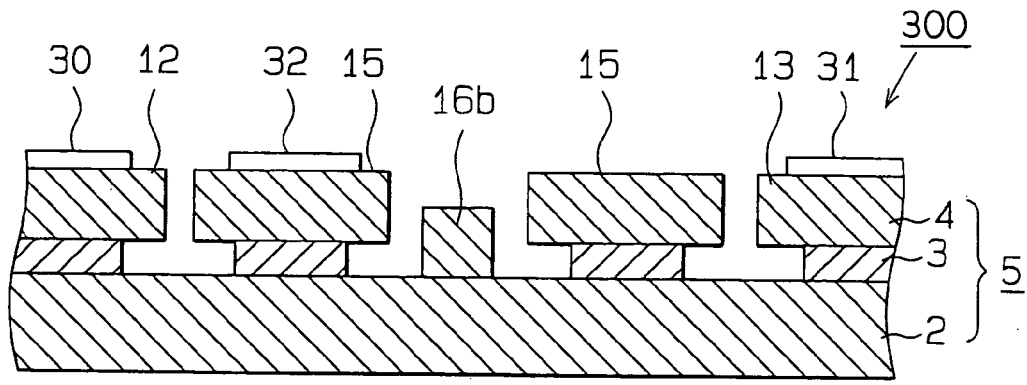
FIG. 11 is a cross-sectional view showing an optical device according to a third embodiment of the present invention.

An optical device 300 according to a third embodiment of the present invention is shown in FIG. 11. The device 300 includes the beam 16a, 16b contacting the first silicon layer 2. Specifically, the beam 16a, 16b is separated from the other part of the second silicon layer 4, and part of the embedded oxide film 3 disposed under the beam 16a, 16b is removed so that the beam 16a, 16b contacts the first silicon layer 2 and is on the first silicon layer 2.

Figure 12A:
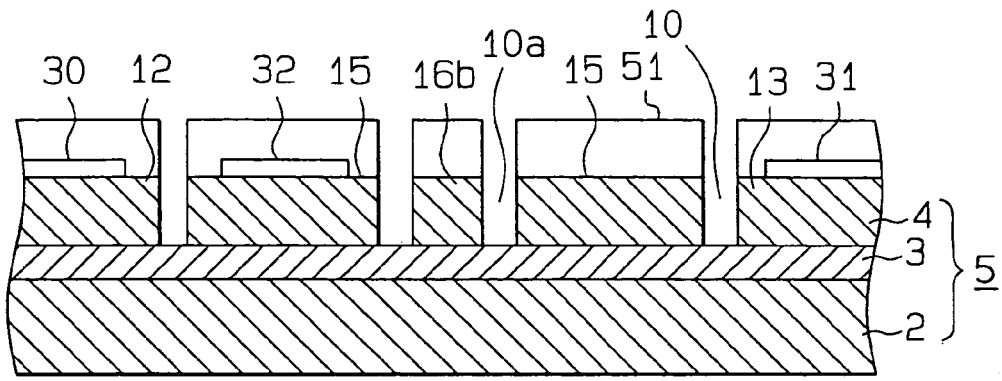
FIGS. 12A and 12B are cross-sectional views explaining a method for manufacturing the device according to the third embodiment.
Figure 12B:
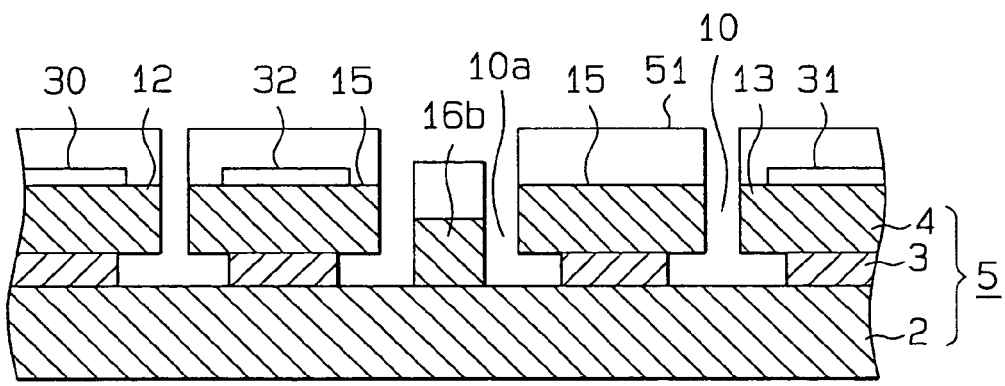

The device 300 is manufactured as follows. As shown in FIG. 12A, a mask 51 is formed on the second silicon layer 4. Then, the trench 10 is formed with using dry-etching method so as to reach the embedded oxide film 3. At that time, the trench 10a is also formed. After that, part of the embedded oxide film 3 disposed under the beam 16a, 16b is etched and removed.

In this case, although the beam 16a, 16b is separated, the beam 16a, 16b connects to the first silicon layer 2 electrically. Here, the electric potential of the first silicon layer 2 is controlled with an electrode (not shown), so that the electric potential of the movable portion 17, i.e., the comb-teeth movable electrode 20a, 20b can be controlled. Specifically, the trench 10a is formed such that the second silicon layer 4 is etched until the embedded oxide film 3 is exposed. After that, part of the embedded oxide film 3 disposed under the beam 16a, 16b is etched and removed, so that the beam 16a, 16b contacts the first silicon layer 2.

Thus, the device 300 has a large scanning angle. Further, the device 300 can scan widely at any frequency.

Figure 13:
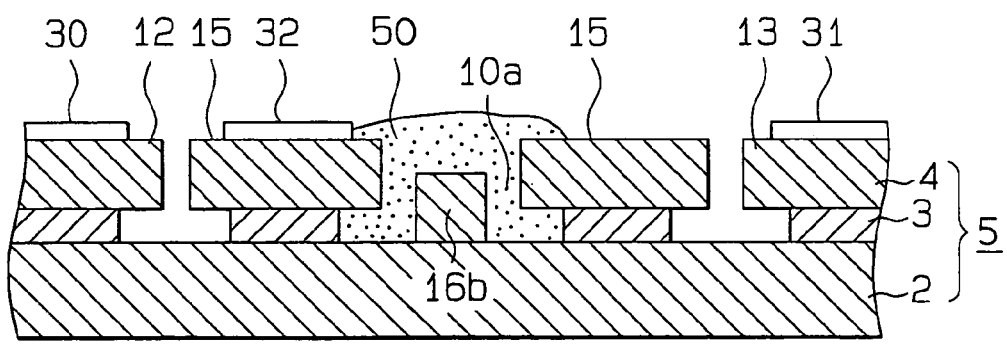
FIG. 13 is a cross-sectional view showing an optical device according to a modification of the third embodiment.

Further, the device 300 can include a conductive material 50, as shown in FIG. 13. The beam 16a, 16b is separated from the other part of the second silicon layer 4 and the embedded oxide film 3. Here, the trench 10a separates the beam 16a, 16b from the other part. The conductive material 50 is disposed in the trench 10a. The conductive material 50 has a small Young's modulus, which is smaller than that of the beam 16a, 16b (i.e., Young's modulus of the second silicon layer 4). The conductive material 50 is formed of, for example, conductive resin. Therefore, the beam 16a, 16b connects to the other part of the second silicon layer 4 electrically through the conductive material 50.

Accordingly, the electric potential of the movable portion 17, i.e., the comb-teeth movable electrode 20a, 20b sets to be equal to that of the fifth fixed portion 15. Therefore, the electric potential of the movable portion 17 is stabilized so that the movable portion 17 is oscillated surely. Further, the movable portion 17 does not prevent from being oscillated since the Young's modulus of the conductive material 50 is smaller than that of the beam 16a, 16b. Furthermore, the movable portion 17 is supported by the conductive material 50 so that the movable portion 17 is oscillated precisely. It is preferred that the conductive material 50 includes a material having a small restoring force, which is smaller than that of the beam 16a, 16b.

Figure 14:
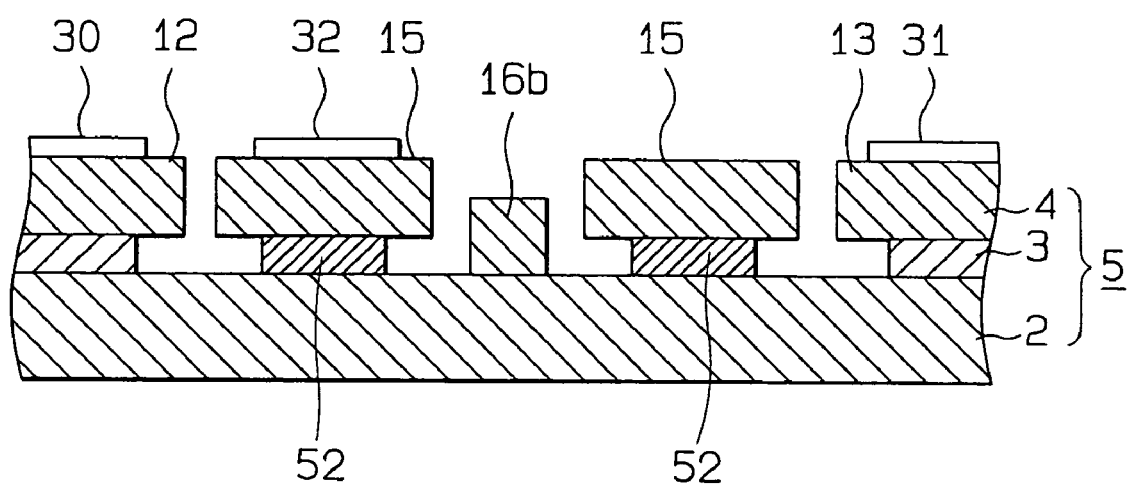
FIG. 14 is a cross-sectional view showing an optical device according to another modification of the third embodiment.

Furthermore, the device 300 can include a conductive layer 52, as shown in FIG. 14. The conductive layer is made of electrically conductive material such as poly crystalline silicon so that the fifth fixed electrode 15 is electrically connected to the first silicon layer 2 through the conductive layer 52. Therefore, the beam 16a, 16b is electrically connected to the aluminum pad 32 through the first silicon layer 2 surely. Therefore, the electric potential of the movable portion 17 is stabilized so that the movable portion 17 is oscillated surely.

The device 300 having the conductive layer 52 is manufactured as follows. At first, the SOI substrate 5 having the conductive layer 52 is prepared as follows. Part of the embedded oxide film 3 is etched and removed. The part of the embedded oxide film 3 corresponds to the fifth fixed electrode 15. Thus, the embedded oxide film 3 has a hole, and then an electrical conductive material fills in the hole, so that the conductive layer 52 is formed. The conductive layer 52 can be formed with another method such as deposition of poly crystalline silicon. Next, the second silicon layer 4 is formed on the embedded oxide layer 3 having the conductive layer 52, so that the SOI substrate 5 is prepared.

Next, the trenches 10, 10a are formed with using dry-etching method so as to reach the embedded oxide film 3. After that, part of the embedded oxide film 3 disposed under the beam 16a, 16b is etched and removed. In this case, although the beam 16a, 16b is separated, the beam 16a, 16b connects to the first silicon layer 2 electrically. Thus, the device 300 having the conductive layer 52 is completed.

Fourth Embodiment

Figure 15A:
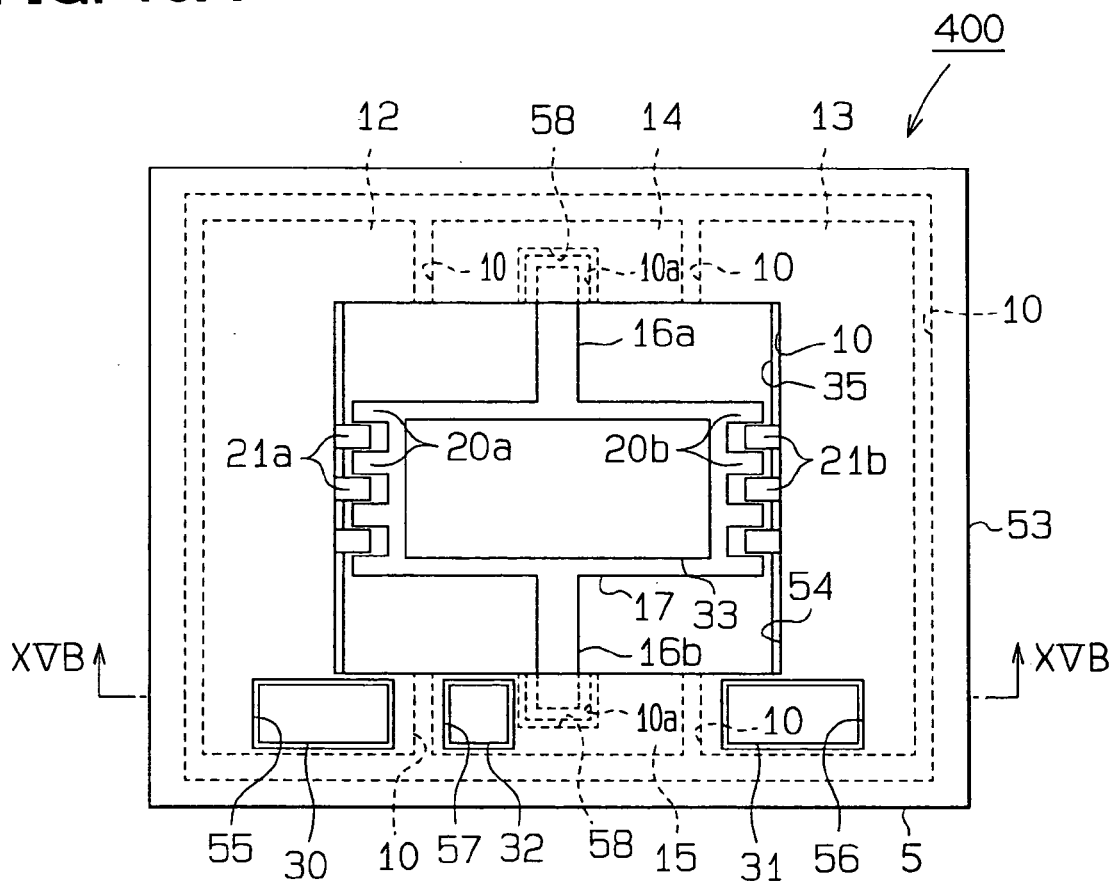
FIG. 15A is a plan view showing an optical device according to a fourth embodiment of the present invention.
Figure 15B:
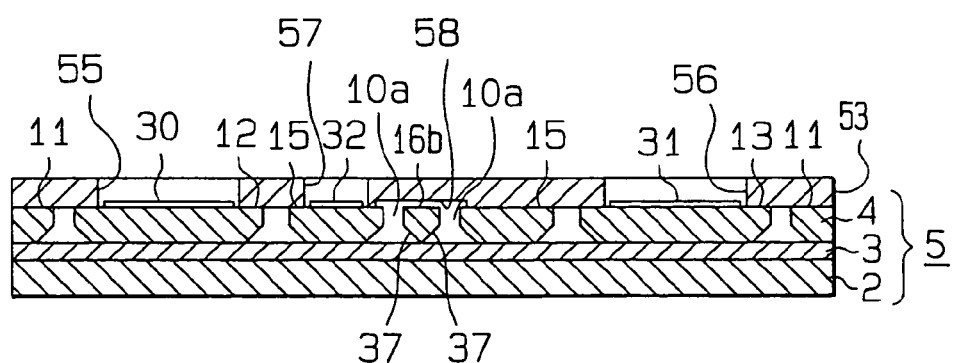
FIG. 15B is a cross-sectional view showing the device taken along line XVB—XVB in FIG. 15A.

An optical device 400 according to a fourth embodiment of the present invention is shown in FIGS. 15A and 15B. The beam 16a, 16b is separated from the other part of the second silicon layer 4 and the embedded oxide film 3. Then, a silicon substrate 53 is adhered to the SOI substrate 5 so that the movable portion 17, i.e., the mirror 33 does not drop off. Specifically, the beam 16a, 16b is surrounded by the silicon substrate 53 so that the silicon substrate 53 works as a cap for preventing the movable portion 17 from dropping off.

Specifically, the silicon substrate 53 includes an opening 54. The movable portion 17 is exposed from the silicon substrate 53 through the opening 54 so that the movable portion 17 is oscillated. The silicon substrate 53 further includes other openings 55–57, so that the aluminum pads 30–32 are exposed from the silicon substrate 53 through the openings 55–57, respectively. Further, the silicon substrate 53 includes a concavity 58. The concavity is disposed on the backside surface of the silicon substrate 53, and disposed over the beam 16a, 16b. The beam 16a, 16b does not contact the silicon substrate 53 because of the concavity 58 even when the beam 16a, 16b is oscillated. An insulation film (not shown) is formed on the backside surface of the silicon substrate 53. Therefore, the silicon substrate 53 and the second silicon layer 4 are separated electrically. Thus, the device 400 has a large scanning angle. Further, the device 400 can scan widely at any frequency.

Although the silicon substrate 53 is used as a cap for preventing the movable portion 17 from dropping off, other means such as a thin film can be used as a cap. Further, the device 400 can have the conductive material 50 disposed in the trench 10a.

Fifth Embodiment

An optical device 500 according to a fifth embodiment of the present invention is shown in FIGS. 16–18B. The device 500 includes the SOI substrate 5 having a concavity or a through hole (not shown) such as the trench 10 and the through hole 35. A movable portion 61 is disposed on the concavity or the through hole. The movable portion 61 is supported by a torsion bar 60, and has a light reflection mirror (not shown). The movable portion 61 is connected to the torsion bar 60 through a pair of beams 62a, 62b. The movable portion 61 includes a pair of weight portions 61a, 61b. The torsion bar 60 is disposed between the weight portions 61a, 61b. Specifically, a torsion axis L1 of the torsion bar 60 is disposed in the middle of the weight portions 61a, 61b. A pair of openings 63a, 63b is disposed between the weight portion 61a, 61b and the torsion bar 60, respectively.

A comparison optical device 501 as a comparison is shown in FIGS. 19–21B. The comparison device 501 has the torsion bar 60 and the movable portion 561, but does not have the opening 63a, 63b. The movable portion 561 has a rectangular shape. Each torsion bar 60 protrudes from the center of a wide side of a rectangle of the movable portion 561.

Figure 18A:
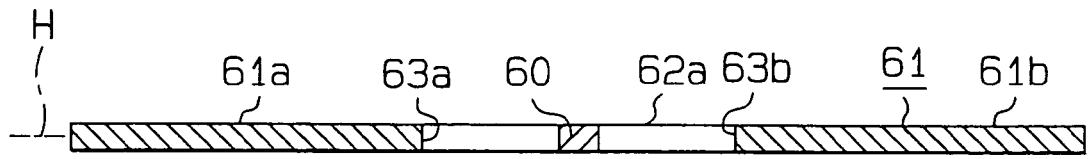
FIGS. 18A and 18B are cross-sectional views showing the device taken along line XVIIIA—XVIIIA in FIG. 16 and explaining an operation of the device according to the fifth embodiment.
Figure 18B:
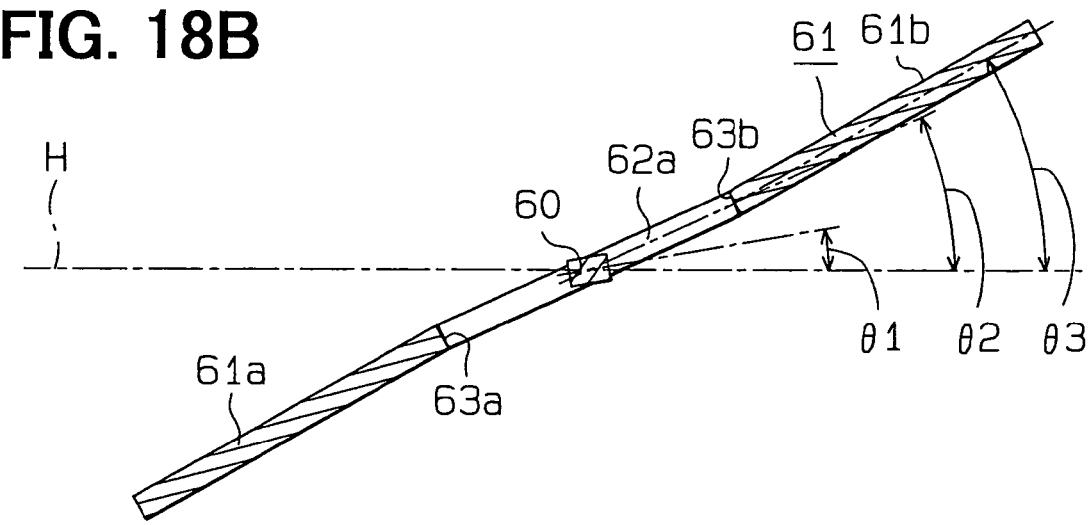
Figure 19:
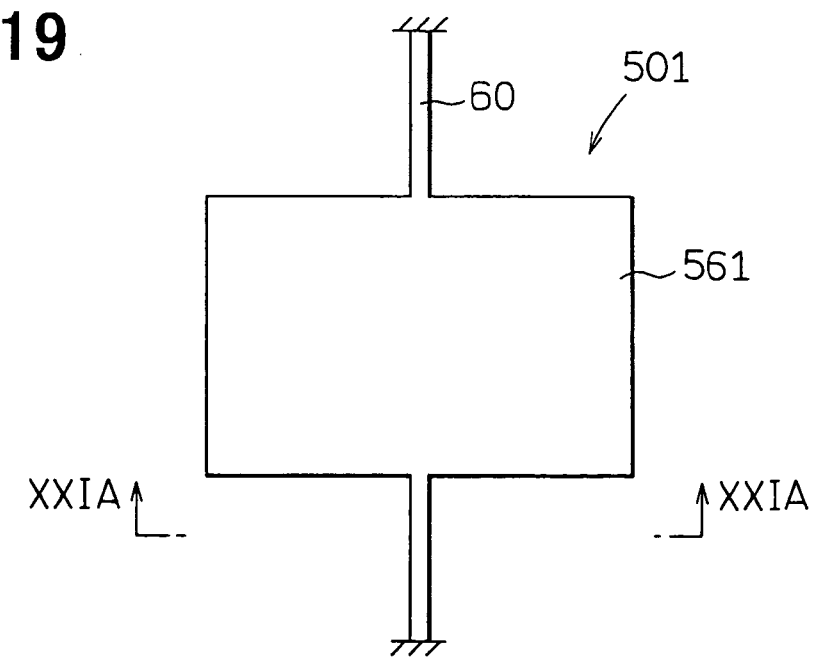
FIG. 19 is a plan view showing a comparison optical device according to the fifth embodiment.
Figure 20:
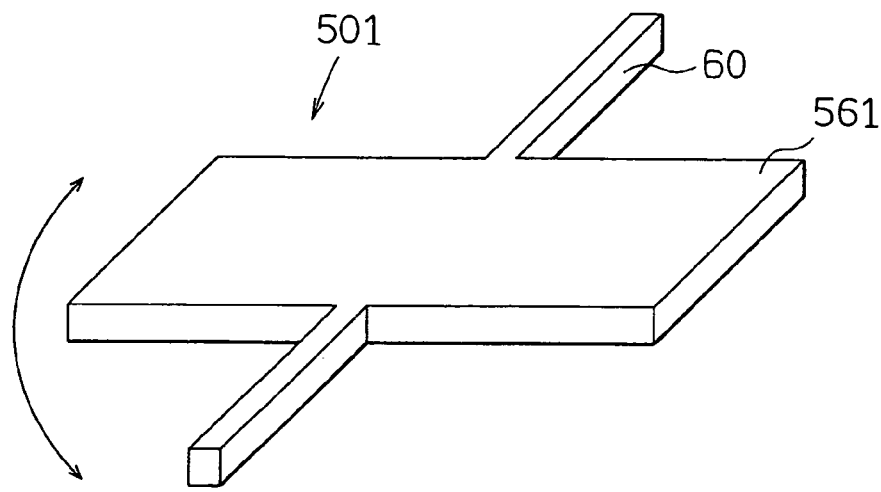
FIG. 20 is a perspective view showing the comparison optical device according to the fifth embodiment.

FIGS. 18A and 18B explain an oscillation of the movable portion 61 of the device 500. When the torsion bar 60 is twisted, i.e., rotated, the movable portion 61 is also rotated together with the torsion bar 60. In this case, the beam 62a, 62b protruded from the torsion bar 60 is deformed in accordance with a rotation of the torsion bar 60. Therefore, an oscillation angle (i.e., a scanning angle) of the movable portion 61 having the mirror (not shown) becomes larger. Specifically, a rotation angle θ3 (i.e., the oscillation angle) between a horizontal plane H and the movable portion 61 is larger than a rotation angle θ2 between the horizontal plane H and the beam 62a, 62b, and the rotation angle θ2 is larger than a rotation angle θ1 between a horizontal plane H and the torsion bar 60. Therefore, the rotation angle θ3 of the movable portion 61 is enlarged.

Figure 21A:
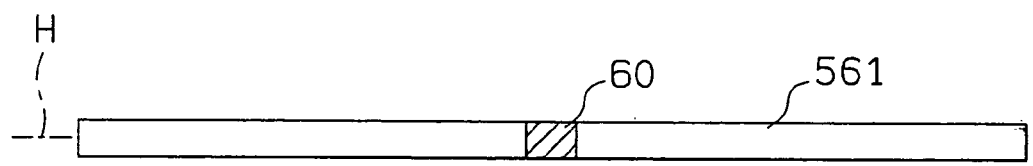
FIGS. 21A and 21B are cross-sectional views showing the device taken along line XXIA—XXIA in FIG. 19 and explaining an operation of the comparison optical device according to the fifth embodiment.
Figure 21B:
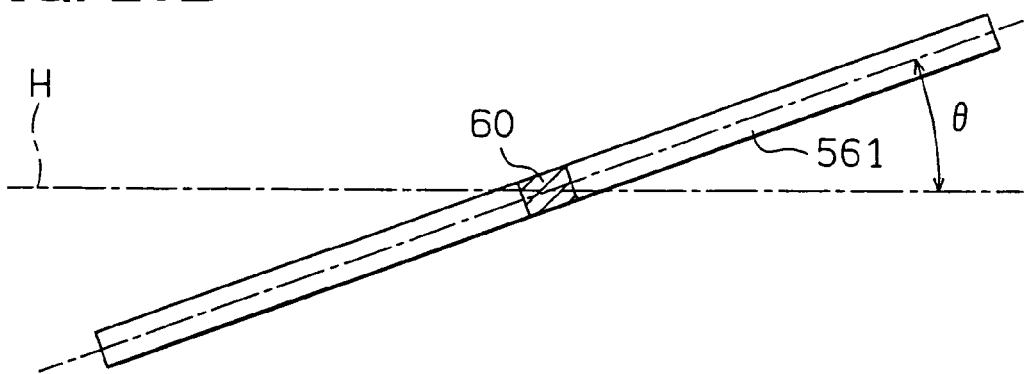

FIGS. 21A and 21B also explain an oscillation of the movable portion 561 of the device 501. When the torsion bar 60 is twisted, i.e., rotated, the movable portion 561 is also rotated in accordance with the torsion bar 60. In this case, an oscillation angle (i.e., a scanning angle) of the movable portion 561 having the mirror (not shown) is not enlarged. Specifically, a rotation angle θ (i.e., the oscillation angle) between the horizontal plane H and the movable portion 561 is equal to a rotation angle θ between a horizontal plane H and the torsion bar 60. Therefore, the rotation angle θ of the movable portion 561 is not enlarged.

Thus, the device 500 has a large scanning angle. Further, the device 500 can scan widely at any frequency.

Figure 22:
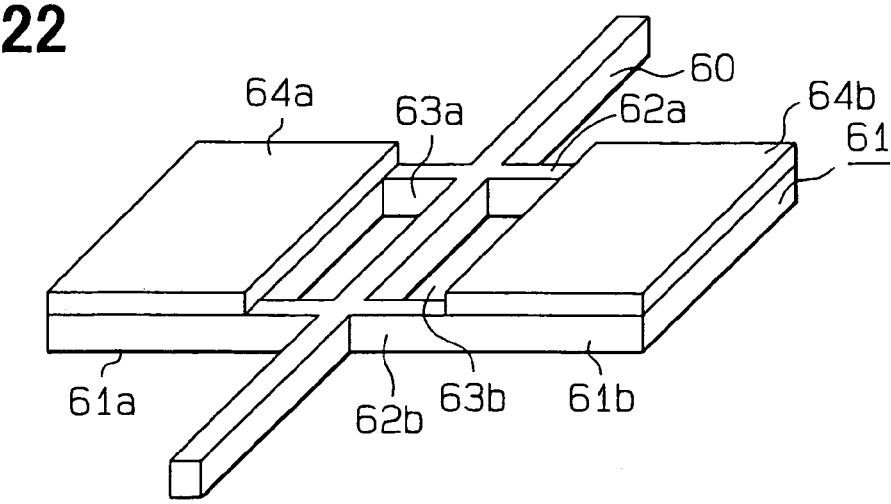
FIG. 22 is a perspective view showing an optical device according to a first modification of the fifth embodiment.

The device 500 can include a pair of reflection mirrors 64a, 64b disposed on the movable portion 61, as shown in FIG. 22. Each reflection mirror 64a, 64b is formed on the weight portion 61a, 61b, respectively.

Thus, the movable portion 61 of the device 500 is separated with the torsion bar 60, and is oscillated with the electro-static force and the like. Here, an oscillation means for oscillating the movable portion 61 is not shown in FIGS. 16 and 17. The movable portion 61 is connected to the torsion bar 60 through the beam 62a, 62b. Therefore, the rotation angle θ3 (i.e., the oscillation angle) of the movable portion 61 is enlarged in relation to the rotation angle θ1 of the torsion bar 60, since the beam 62a, 62b is deformed. That is, the rotation angle θ3 is larger than the rotation angle θ1 (i.e., θ3≧θ1).

Further, a partial resonant frequency of a partial structure composed of the beam 62a, 62b and the movable portion 61 is set to be higher than a total resonant frequency of a total structure composed of the torsion bar 60, the beam 62a, 62b and the movable portion 61. Here, the partial resonant frequency is obtained such that the movable portion 61 is oscillated at the partial resonant frequency in a case where the elementary part (i.e., the root) of the torsion bar 60 is assumed to be a cantilevered fixed end.

Figure 23A:
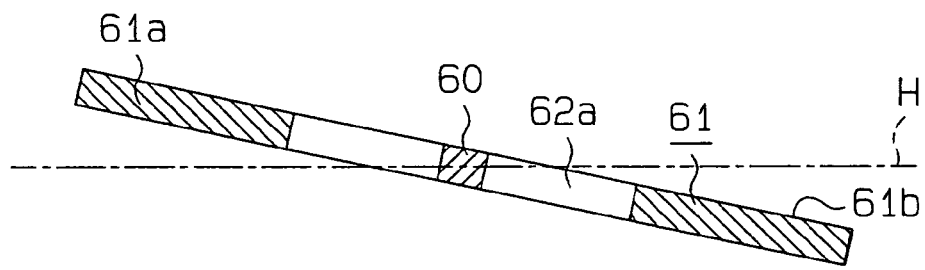
FIGS. 23A–23C are cross-sectional views explaining an operation of the device according to the fifth embodiment.
Figure 23B:
Figure 23C:
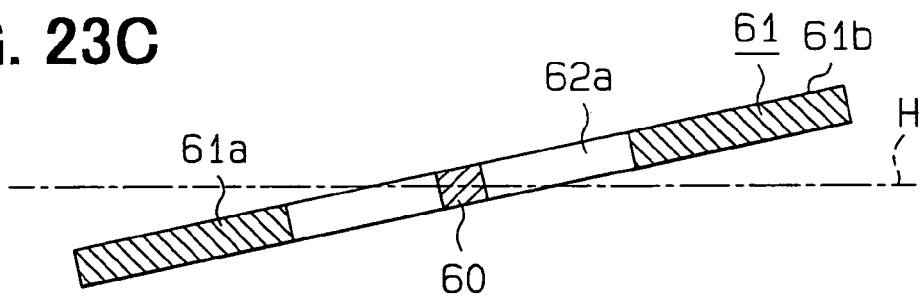
Figure 24A:
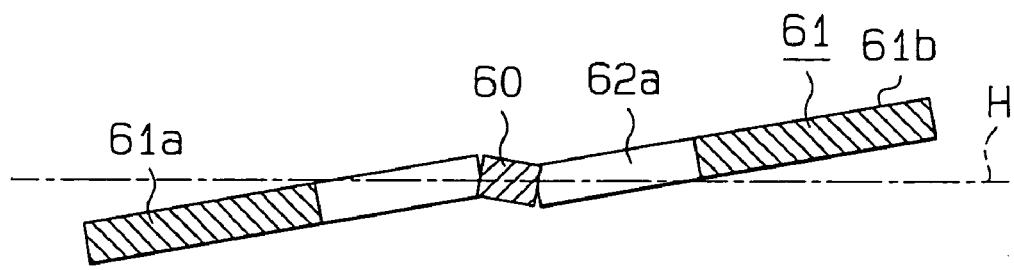
FIGS. 24A–24C are cross-sectional views explaining an operation of the device according to the fifth embodiment.
Figure 24B:
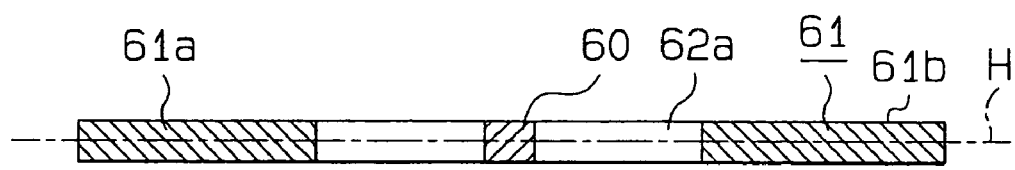
Figure 24C:
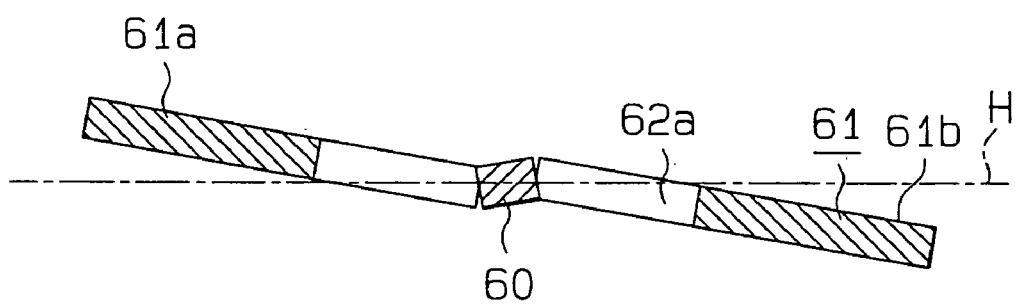

Thus, the partial resonant frequency is higher than the total resonant frequency, so that a deformation displacement of the beam 62a, 62b is maximized in relation to the oscillation of the torsion bar 60, and a follow-up of the beam 62a, 62b to the oscillation of the torsion bar 60 is improved. Specifically, the rotation angle θ3 of the movable portion 61 becomes to be equal to the rotation angle θ1 of the torsion bar 60 in a case where the partial resonant frequency coincides with the total resonant frequency, as shown in FIGS. 23A–23C. In a case where the partial resonant frequency is lower than the total resonant frequency, the rotation angle θ3 of the movable portion 61 becomes to be smaller than the rotation angle θ1 of the torsion bar 60, as shown in FIGS. 24A–24C. Therefore, the rotation angle θ3 of the movable portion 61 is reduced in relation to the rotation angle θ1 of the torsion bar 60.

Accordingly, in a case where the partial resonant frequency is higher than the total resonant frequency, the rotation angle θ3 of the movable portion 61 is enlarged in relation to the rotation angle θ1 of the torsion bar 60. Thus, the movable portion 61 can be oscillated largely even when the electro-static force for oscillating the movable portion 61 is comparatively small. That is, the device 500 has a large scanning angle. Further, the device 500 can scan widely at any frequency.

Figure 16:
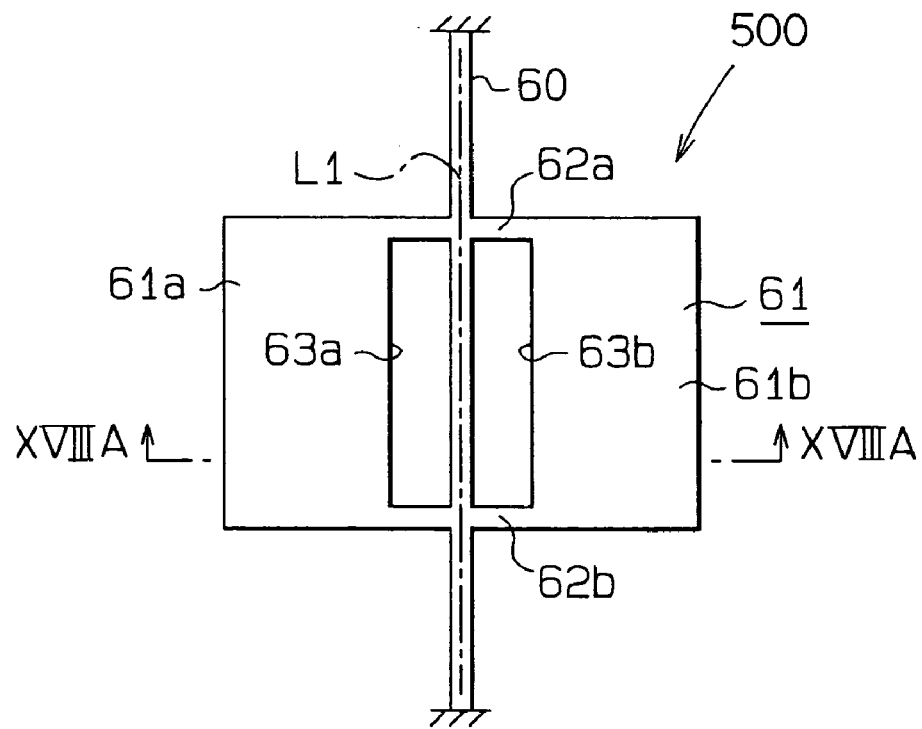
FIG. 16 is a plan view showing an optical device according to a fifth embodiment of the present invention.
Figure 17:
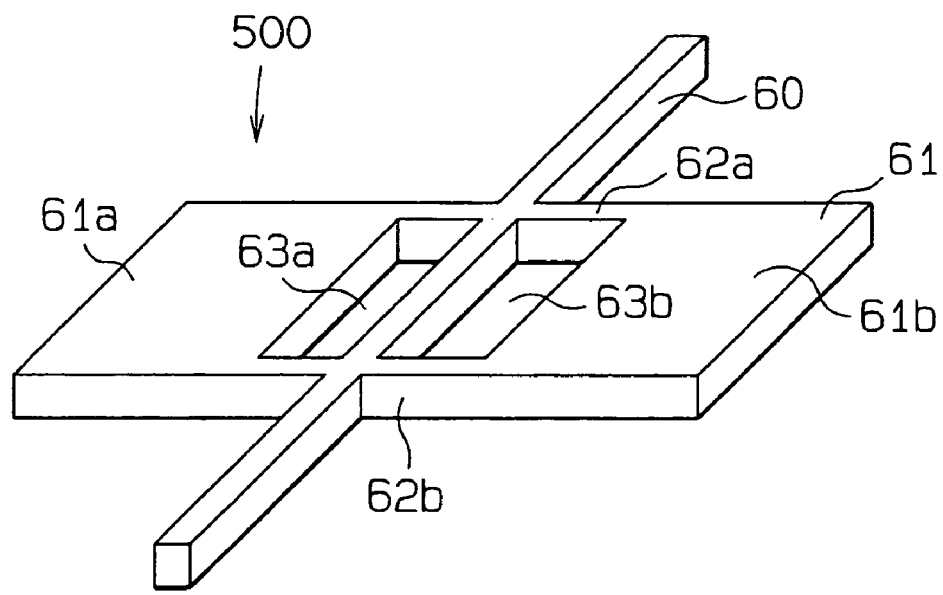
FIG. 17 is a perspective view showing the device according to the fifth embodiment.
Figure 25:
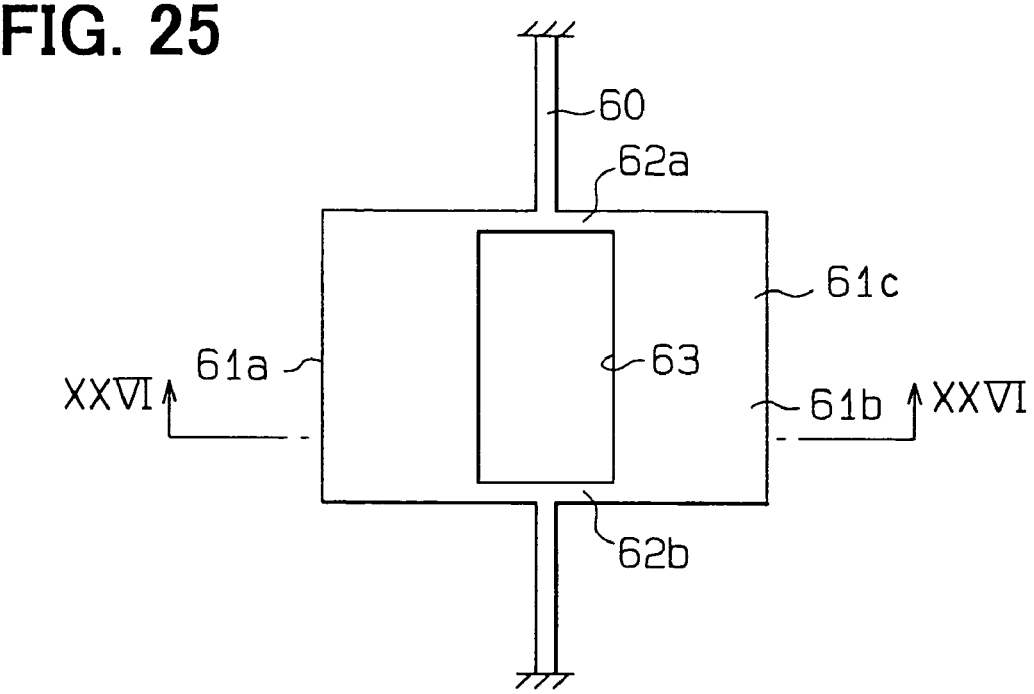
FIG. 25 is a plan view showing an optical device according to a second modification of the fifth embodiment.
Figure 26:
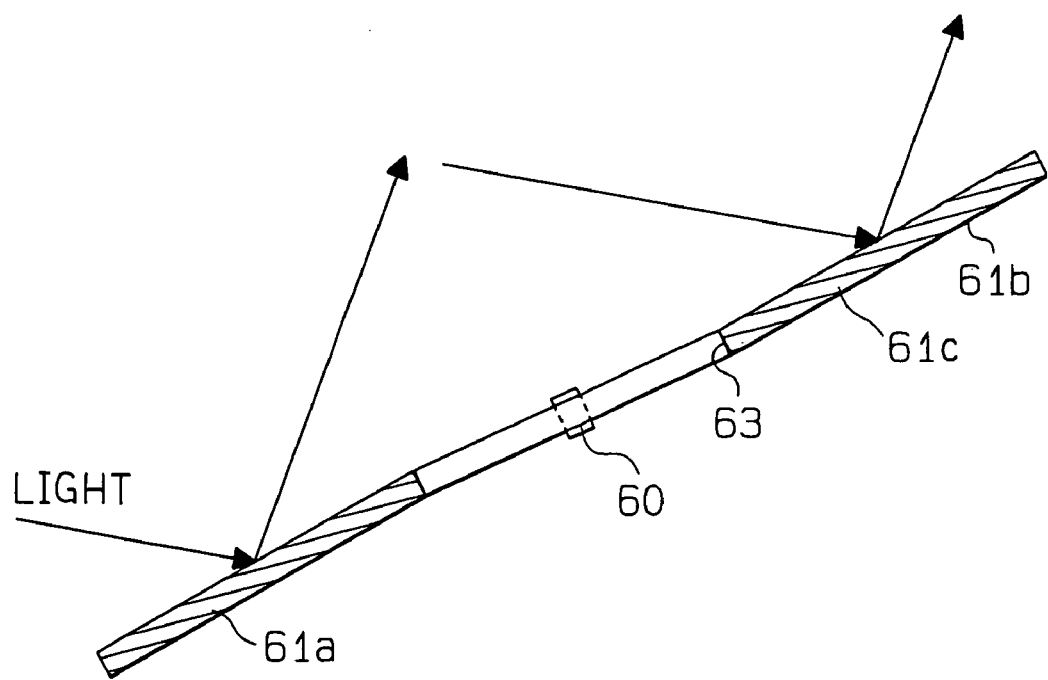
FIG. 26 is a cross-sectional view showing the device taken along line XVI—XVI in FIG. 25 and explaining an operation of the device according to the second modification of the fifth embodiment.

Further, the device 500 can have another movable portion 61c, as shown in FIGS. 25 and 26. The movable portion 61c is separated in relation to the torsion bar 60, and the torsion bar 60 is separated into two parts so that there is no torsion bar 60 between the weight portions 61a, 61b. That is because part of the torsion bar 60 disposed between the weight portions 61a, 61b shown in FIG. 16 is not applied with any external force substantially. Therefore, the part of the torsion bar 60 is not deformed. Thus, the part of the torsion bar 60 is removed from the movable portion 61 of the device 500 shown in FIG. 16 so that the movable portion 61c is formed.

The device 500 having the movable portion 61c has the following advantage. FIG. 26 shows a light path of a light such as a laser beam reflected on the mirror disposed on the weight portion 61a, 61b of the movable portion 61c. The light path of the light reflected on the weight portion 61a is equal to that of the light reflected on the weight portion 61b. Therefore, all of the light is reflected toward the same direction.

Figure 27:
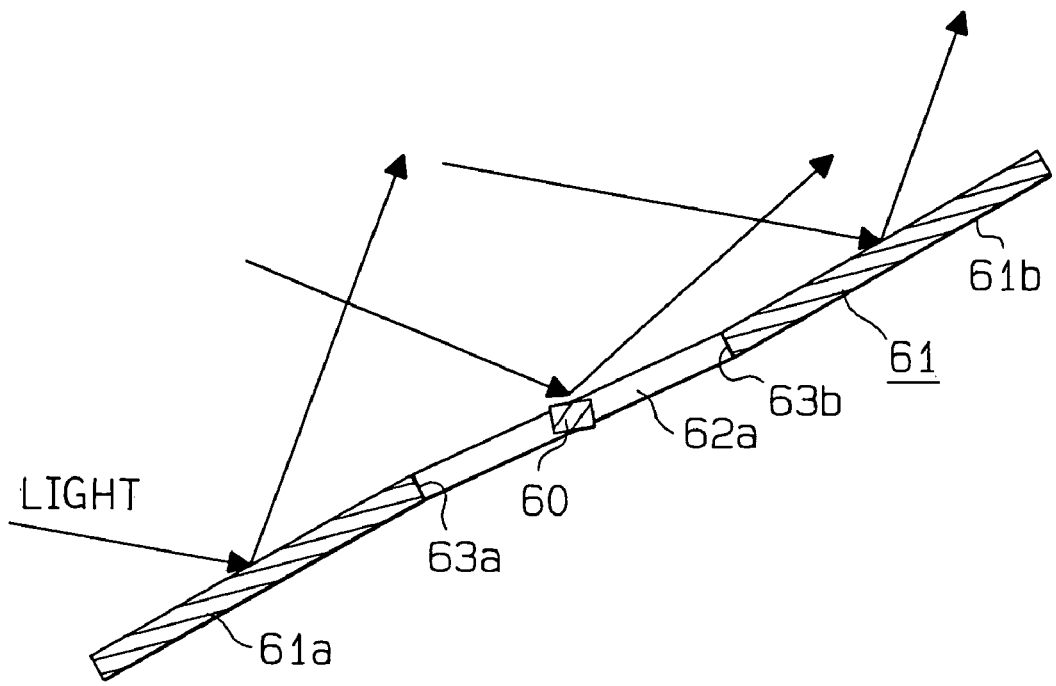
FIG. 27 is a cross-sectional view explaining an operation of the device according to the fifth embodiment.

On the other hand, FIG. 27 shows a light path of the light reflected on the mirror disposed on the weight portion 61a, 61b of the movable portion 61. The light is also reflected on the torsion bar 60 disposed between the weight portions 61a, 61b. Here, the rotation angle θ3 of the movable portion 61 is different from the rotation angle θ1 of the torsion bar 60. Therefore, the light reflected on the torsion bar 60 has a different light path, which is different from that of the light reflected on the weight portion 61a, 61b. Specifically, the light is reflected on the torsion bar 60 toward a certain direction, and the light is reflected on the weight portion 61a, 61b toward a different direction. Therefore, the light reflected on the torsion bar 60 provides a noise.

However, in the device 500 having the movable portion 61c, all of the light reflects toward the same direction, so that the noise in the device 500 having the movable portion 61c is reduced.

Figure 28:
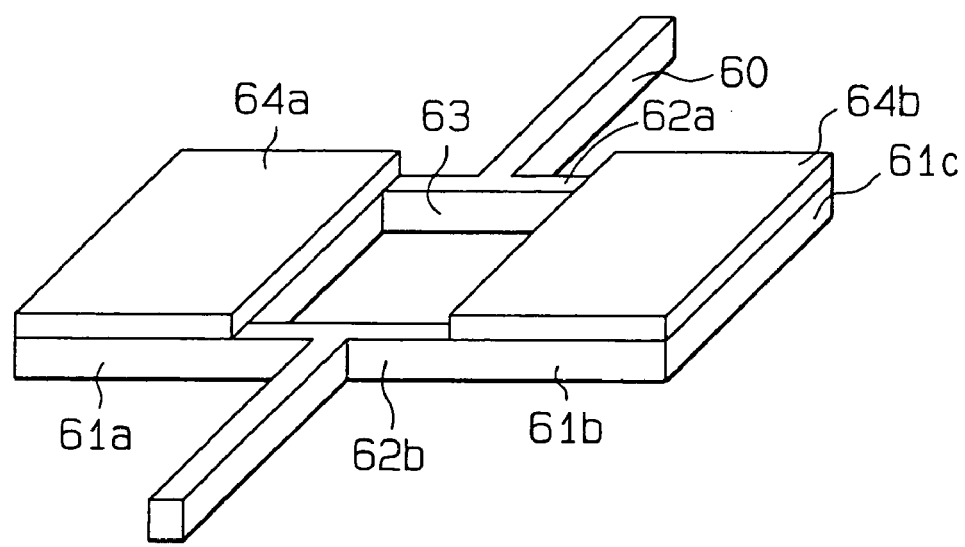
FIG. 28 is a perspective view showing an optical device according to a third modification of the fifth embodiment.

Further, the device 500 can have the movable portion 61c with a pair of reflection mirrors 64a, 64b disposed on the weight portions 61a, 61b, as shown in FIG. 28.

Figure 29:
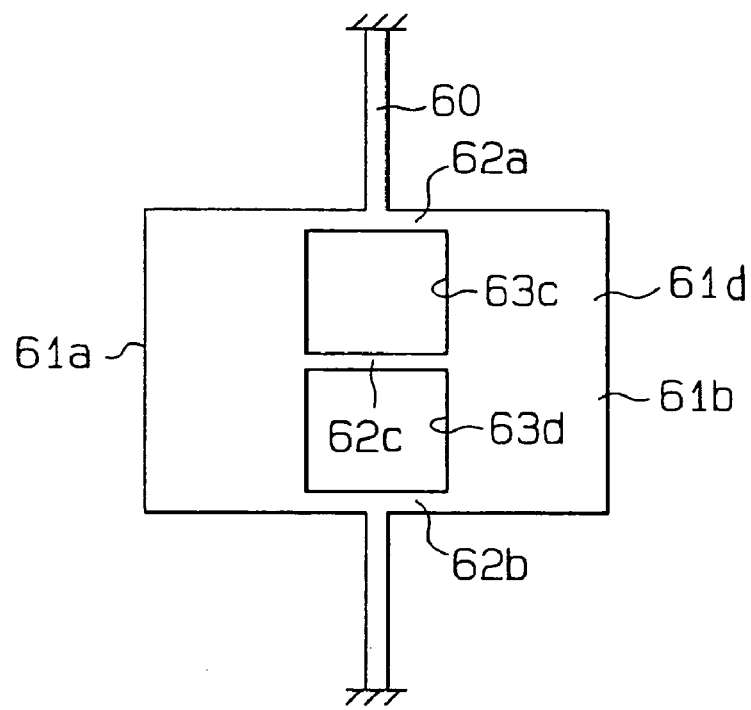
FIG. 29 is a plan view showing an optical device according to a fourth modification of the fifth embodiment.

Furthermore, the device 500 can have further another movable portion 61d, as shown in FIG. 29. In the movable portion 61d, the weight portions 61a, 61b are connected with a plurality of beams. Specifically, the weight portions 61a, 61b are connected with three beams 62a–62c. That is, the movable portion 61d has a multi-coupled construction, in which the weight portions 61a, 61b is connected together with three beams 62a–62c. Therefore, the oscillation of the movable portion 61 is stabilized. Further, the rotation angle θ3 of the movable portion 61 (i.e., the weight portion 61a, 61b) is almost equal to a rotation angle of the beam 62a–62c. Therefore, all of the light is reflected on the weight portions 61a, 61b and the beams 62a–62c toward the same direction.

Figure 30:
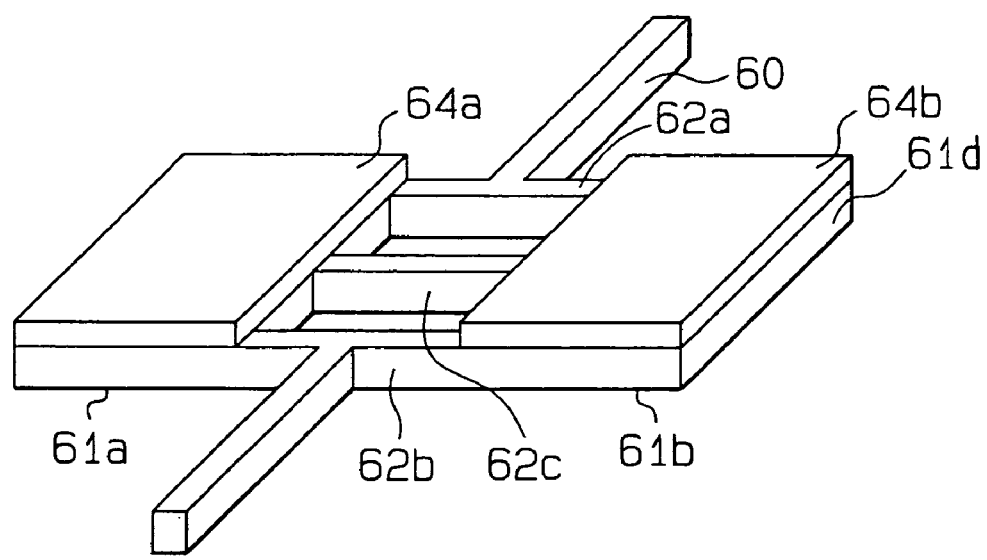
FIG. 30 is a perspective view showing an optical device according to a fifth modification of the fifth embodiment.

Further, the device 500 can have the movable portion 61d with a pair of reflection mirrors 64a, 64b disposed on the weight portions 61a, 61b, as shown in FIG. 30.

Sixth Embodiment

Figure 31:
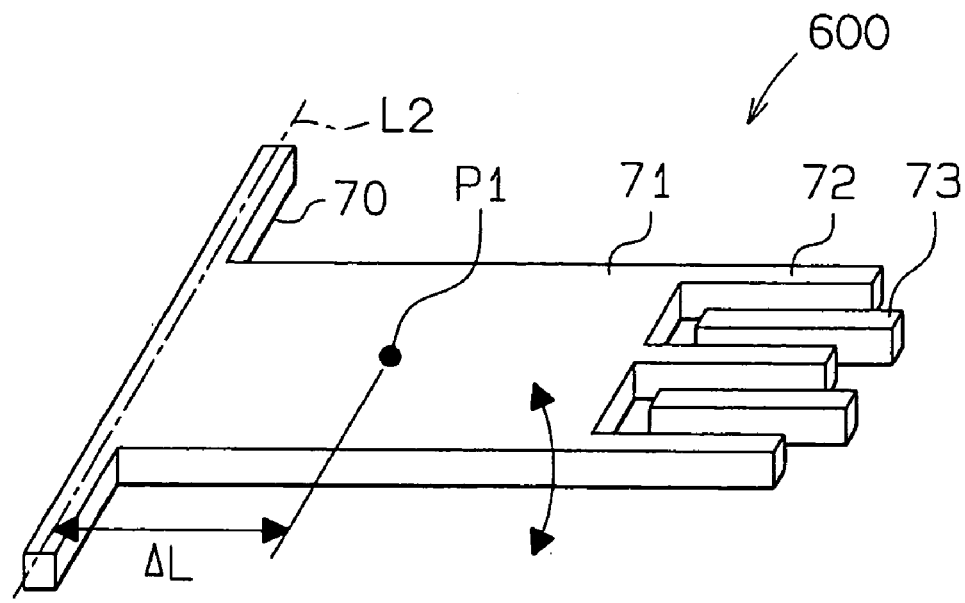
FIG. 31 is a perspective view showing an optical device according to a sixth embodiment of the present invention.
Figure 32:
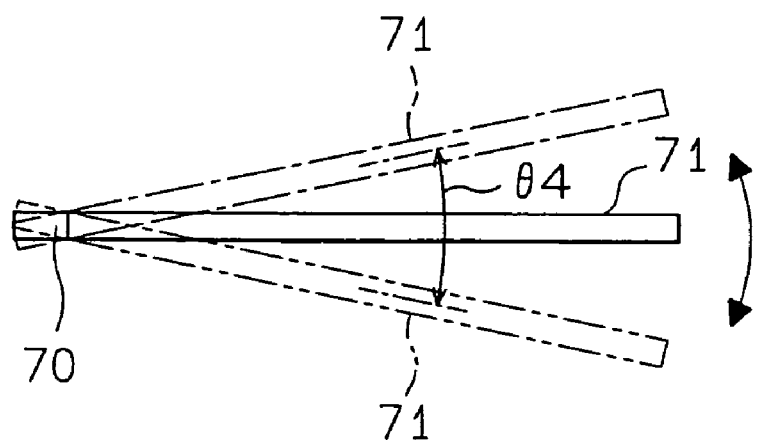
FIG. 32 is a front view explaining an operation of the device according to the sixth embodiment.

An optical device 600 according to a sixth embodiment of the present invention is shown in FIG. 31. The device 600 includes a torsion bar 70 having a torsion axis L2 and a movable portion 71 having a center of mass P1. The movable portion 71 includes a comb-teeth movable electrode 72, which faces a comb-teeth fixed electrode 73. The center of mass P1 of the movable portion 71 shifts from the torsion axis L2 of the torsion bar 70. Specifically, the center of mass P1 shifts from the torsion axis L2 with a distance ΔL between the center of mass P1 and the torsion axis L2. In this case, the movable portion 71 is rotated with a rotation angle θ4 in accordance with a predetermined rotation force.

Figure 33:
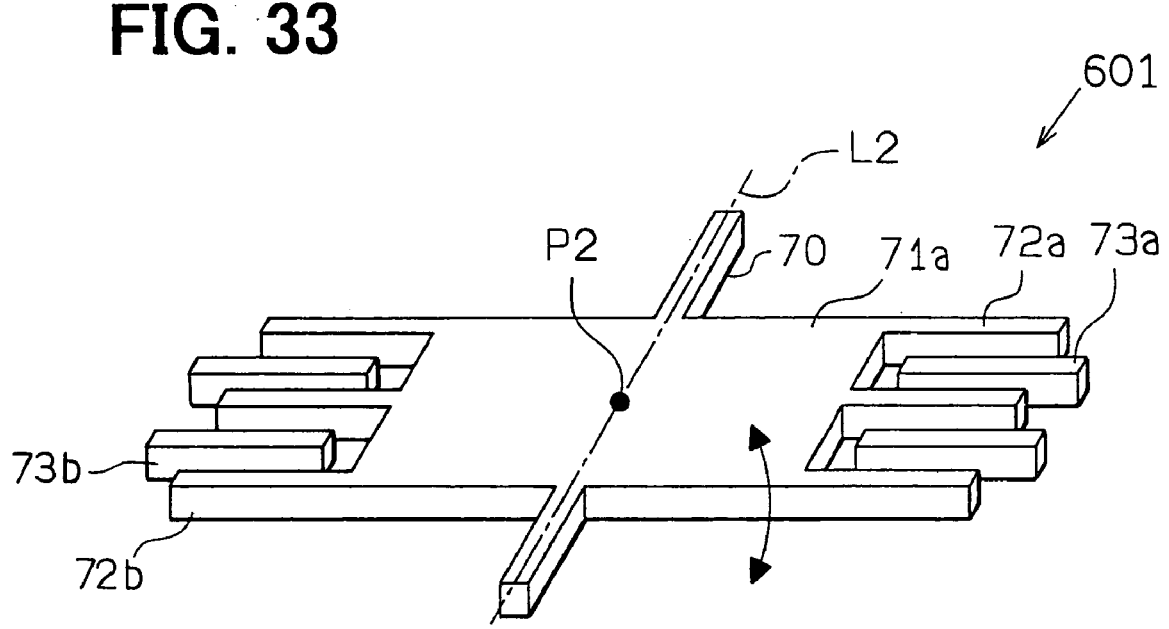
FIG. 33 is a perspective view showing a comparison optical device according to the sixth embodiment.
Figure 34:
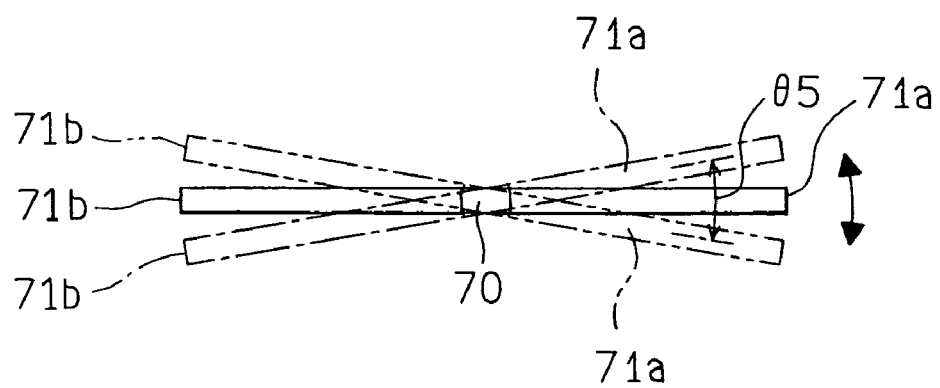
FIG. 34 is a front view explaining an operation of the comparison optical device according to the sixth embodiment.

A comparison optical device 601 as a comparison is shown in FIGS. 33 and 34. The comparison device 601 includes the torsion bar 70 having the torsion axis L2 and a movable portion 71a having a center of mass P2. The movable portion 71a includes a pair of comb-teeth movable electrodes 72a, 72b, which faces a pair of comb-teeth fixed electrodes 73a, 73b. The center of mass P2 of the movable portion 71a is disposed on the torsion axis L2 of the torsion bar 70. In this case, the movable portion 71a is rotated with a rotation angle θ5 in accordance with the predetermined rotation force.

Here, the rotation angle θ4 is larger than the rotation angle θ5 because of influence of a moment of inertia. Thus, the rotation angle θ4 of the movable portion 71 is enlarged compared with the rotation angle θ5 of the movable portion 71a.

Thus, the center of mass P1 of the movable portion 71 is shifted from the torsion axis L2 of the torsion bar 70, so that the rotation angle θ4 of the movable portion 71 is enlarged without changing a mass of the movable portion 71. Further, a resonant frequency of the movable portion 71 is reduced.

Thus, the movable portion 71 can be oscillated largely even when the electro-static force for oscillating the movable portion 71 is comparatively small. That is, the device 600 has a large scanning angle. Further, the device 600 can scan widely at any frequency.

Figure 35:
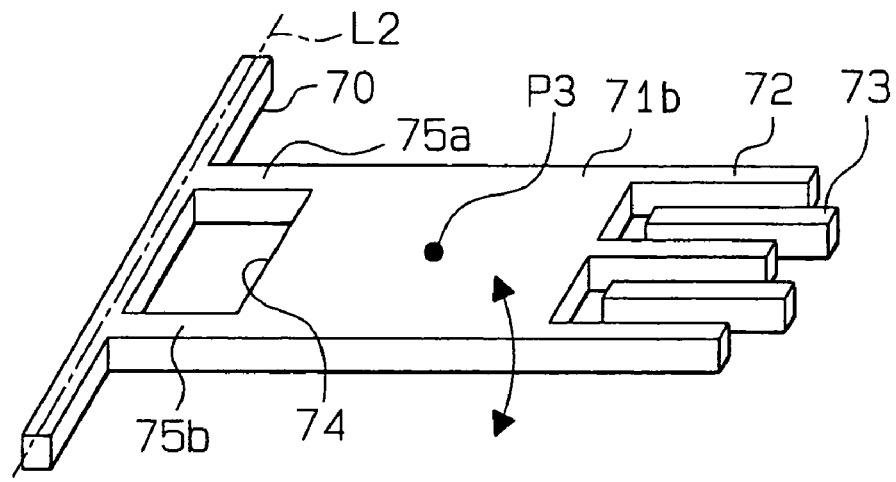
FIG. 35 is a perspective view showing an optical device according to a modification of the sixth embodiment.
Figure 36:
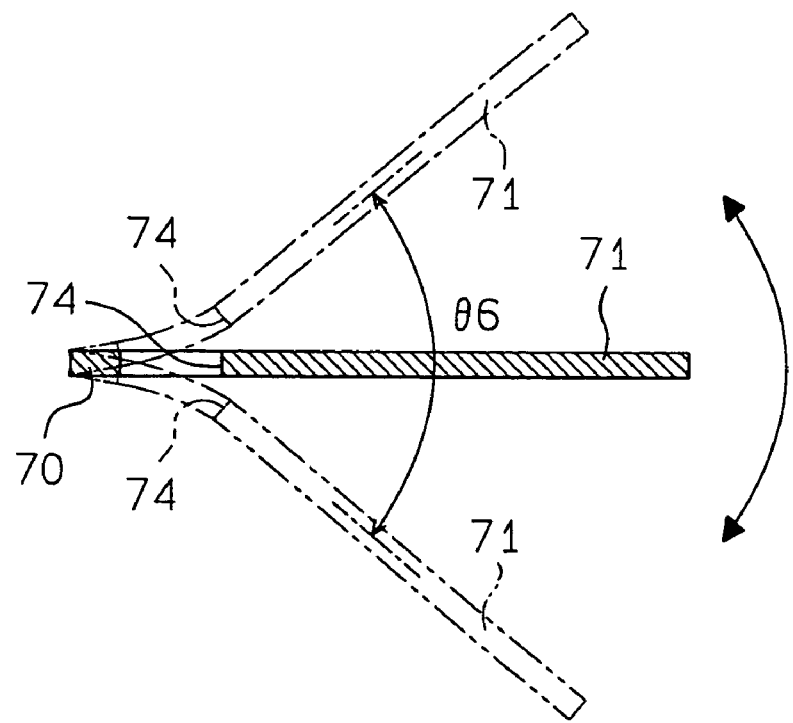
FIG. 36 is a front view explaining an operation of the device according to the modification of the sixth embodiment.

Further, the device 600 can have another movable portion 71b, as shown in FIGS. 35 and 36. The movable portion 71b is connected to the torsion bar 70 through a pair of beams 75a, 75b. An opening 74 is disposed between the torsion bar 70 and the movable portion 71c. In this case, the beams 75a, 75b work as a spring so that a rotation angle θ6 of the movable portion 71b is enlarged. Specifically, the beam 75a, 75b is deformed together with the rotation of the torsion bar 70 so that the rotation angle θ6 of the movable portion 71b becomes larger than the rotation angle θ1 of the torsion bar 60. Therefore, the beam 75a, 75b is deformed so that the movable portion 71 is oscillated much largely. That is, the device 600 having the movable portion 71b has a large scanning angle. Further, the device 600 can scan widely at any frequency.

Such changes and modifications are to be understood as being within the scope of the present invention as defined by the appended claims.

What is claimed is:

1. An optical device comprising:
    a semiconductor substrate having an opening;
    a support member disposed on the substrate;
    a movable portion disposed on the opening of the substrate; and
    a trench,
    wherein the movable portion is movably supported by the support member,
    wherein the substrate includes a silicon-on-insulator substrate having a first silicon layer, an embedded insulation film, and a second silicon layer so arranged in the recited order,
    wherein the opening of the substrate provides a through hole disposed in the substrate,
    wherein the support member is disposed on the embedded insulation film and is separated from the second silicon layer,
    wherein the trench connects to the through hole so that the movable portion is separated from the substrate by the trench and the through hole, wherein the support member is includes a pair of beams,
wherein each beam is separated from the seconds silicon layer and the embedded insulation layer by the trench so that the beam is movably disposed on the embedded insulation layer,
wherein the movable portion connects to the beams working as a supporting point of the movable portion,
wherein the movable portion includes a mirror disposed thereon for reflecting a light, and
wherein each beam includes a lower portion having a wedge shape contacting the embedded insulation film so that the beam can be move freely.

2. An optical device comprising:
a semiconductor substrate having an opening;
a support member disposed on the substrate;
a movable portion disposed on the opening of the substrate;
a trench; and
a conductive material disposed in the trench between the beam and the second silicon layer,
wherein the movable portion is movably supported by the support member,
wherein the substrate includes a silicon-on-insulator substrate having a first silicon layer, an embedded insulation film and a second silicon layer so arranged in the recited order,
wherein the opening of the substrate provides a through hole disposed in the substrate,
wherein the support member is disposed on the embedded insulation film and is separated from the second silicon layer,
wherein the trench connects to the through hole so that the movable portion is separated from the substrate by the trench and the through hole,
wherein the support member is includes a pair of beams,
wherein each beam is separated from the second silicon layer and the embedded insulation layer by the trench so that the beam is movably disposed on the embedded insulation layer,
wherein the movable portion connects to the beams working as a supporting point of the movable portion,
wherein the movable portion includes a mirror disposed thereon for reflecting a light,
wherein the conductive material has a Young's modulus, which is smaller than that of the beam, and
wherein the beams are electrically connected to the second silicon layer through the conductive material.

3. An optical device comprising:
a semiconductor substrate having an opening;
a support member disposed on the substrate;
a movable portion disposed on the opening of the substrate;
a trench; and
a conductive layer disposed in the embedded insulation layer,
wherein the movable portion is movably supported by the support member,
wherein the substrate includes a silicon-on-insulator substrate having a first silicon layer, an embedded insulation film and a second silicon layer so arranged in the recited order,
wherein the opening of the substrate provides a through hole disposed in the substrate, wherein the support member is disposed on the embedded insulation film and is separated from the second silicon layer,
wherein the trench connects to the through hole so that the movable portion is separated from the substrate by the trench and the through hole,
wherein the support member is includes a pair of beams,
wherein each beam is separated from the second silicon layer and the embedded insulation layer by the trench so that the beam is movably disposed on the first silicon layer,
wherein the conductive layer is disposed near the beams, and
wherein the beams are electrically connected to the second silicon layer through the first silicon layer and the conductive layer.

4. An optical device comprising:
a semiconductor substrate having an opening;
a support member disposed on the substrate;
a movable portion disposed on the opening of the substrate; and
a trench;
wherein the movable portion is movably supported by the support member,
wherein the substrate includes a silicon-on-insulator substrate having a first silicon layer, an embedded insulation film and a second silicon layer so arranged in the recited order,
wherein the opening of the substrate provides a through hole disposed in the substrate, wherein the support member is disposed on the embedded insulation film and is separated from the second silicon layer,
wherein the trench connects to the through hole so that the movable portion is separated from the substrate by the trench and the through hole,
wherein the support member is includes a pair of beams,
wherein each beam is separated from the second silicon layer and the embedded insulation layer by the trench so that the beam is movably disposed on the first silicon layer, and
wherein the each beam contacts the first silicon layer in such a manner that part of the embedded insulation film disposed under the beam is removed, after the beam is formed so as to separate from the second silicon layer and the embedded insulation film in case of forming the trench.

5. An optical device comprising:
a semiconductor substrate having an opening:
a support member disposed on the substrate;
a movable portion disposed on the opening of the substrate;
a trench; and
a conductive material disposed in the trench between the beams and the second silicon layer,
wherein the movable portion is movably supported by the support member,
wherein the substrate includes a silicon-on-insulator substrate having a first silicon layer, an embedded insulation film and a second silicon layer so arranged in the recited order,
wherein the opening of the substrate provides a through hole disposed in the substrate, wherein the support member is disposed on the embedded insulation film and is separated from the second silicon layer,
wherein the trench connects to the through hole so that the movable portion is separated from the substrate by the trench and the through hole,
wherein the support member is includes a pair of beams, wherein each beam is separated from the second silicon layer and the embedded insulation layer by the trench so that the beam is movably disposed on the first silicon layer, wherein the conductive material has a Young's in modulus, which is smaller than that of the beams, and wherein the beams are electrically connected to the second silicon layer through the conductive material.

6. An optical device comprising:

a semiconductor substrate having an opening;

a support member disposed on the substrate;

a movable portion disposed on the opening of the substrate; and a cap, wherein the movable portion is movably supported by the support member, wherein the cap is disposed on the second silicon layer, and surrounds the support member for preventing the movable portion from dropping off, wherein the cap includes a concavity disposed on a backside surface of the cap, and wherein the backside surface of the cap faces the support member so that the support member moves without contacting the cap.

7. An optical device comprising:

a semiconductor substrate having an opening;

a support member disposed on the substrate; and a movable portion disposed on the opening of the substrate, wherein the movable portion is movably supported by the support member, wherein the opening provides a through hole or a concavity, wherein the support member includes a torsion bar, wherein the movable portion is movably connected to the torsion bar through a beam, wherein the movable portion includes a pair of weight portions and a pair of openings, wherein the torsion bar has a torsion axis disposed between the pair of weight portions, and wherein each opening is disposed between the weight portion and the torsion axis.

8. The device according to claim 7, wherein the bean includes a plurality of beam members so that the opening is surrounded by the weight portion, the torsion axis and the beam members.

9. An optical device comprising:

a semiconductor substrate having an opening;

a support member disposed on the substrate; and a movable portion disposed on the opening of the substrate, wherein the movable portion is movably supported by the support member, wherein the opening provides a through hole or a concavity, wherein the support member includes a torsion bar, wherein the movable portion is movably connected to the torsion bar through a beam, wherein the movable portion includes a pair of weight portions and an opening, wherein the torsion bar has a torsion axis disposed between the pair of weight portions, wherein the beam includes a plurality of beams members, wherein the weight portions are connected together with the beam members so that the opening of the movable portion is disposed between the weight portions and the beam members, and wherein each beam member is perpendicular to the torsion bar.

10. The device according to claim 2, wherein each beam contacts the embedded insulation film.

11. The device according to claim 10, wherein each beam includes a lower portion having a wedge shape so that the beam can be moved freely.

12. The device according to claim 6, wherein each beam contacts the embedded insulation film.

13. The device according to claim 12, wherein each beam includes a lower portion having a wedge shape so that the beam can be moved freely.

14. The device according to claim 6, wherein the cap covers each beam for restricting movement of the beam.

* * * * *

UNITED STATES PATENT AND TRADEMARK OFFICE
CERTIFICATE OF CORRECTION

PATENT NO.          : 7,105,902 B2
APPLICATION NO. : 10/752588
DATED                    : September 12, 2006
INVENTOR(S)         : Kazushi Asami, Kazuhiko Kano and Tetsuo Yoshioka It is certified that error appears in the above-identified patent and that said Letters Patent is hereby corrected as shown below:

Title Page

Correct the named inventors to read as:

(75) Inventors:

Kazushi Asami, Okazaki (JP);
      Kazuhiko Kano, Toyoake (JP);
      Tetsuo Yoshioka, Okazaki (JP)

Signed and Sealed this

Twelfth Day of December, 2006

JON W. DUDAS
*Director of the United States Patent and Trademark Office*